United States Patent
Tsuchiya et al.

(10) Patent No.: US 7,072,338 B2
(45) Date of Patent: Jul. 4, 2006

(54) COMMUNICATING METHOD BETWEEN IPV4 TERMINAL AND IPV6 TERMINAL AND IPV4-IPV6 CONVERTING APPARATUS

(75) Inventors: Kazuaki Tsuchiya, Yokohama (JP); Naoya Ikeda, Ebina (JP); Shinichi Hamamoto, Yamato (JP); Ken Watanabe, Kawasaki (JP); Toshikazu Yasue, Chigasaki (JP); Yoshifumi Atarashi, Zama (JP); Munechika Sumikawa, Hadano (JP); Takahisa Miyamoto, Kawasaki (JP); Hidemitsu Higuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 166 days.

(21) Appl. No.: 09/983,141

(22) Filed: Oct. 23, 2001

(65) Prior Publication Data

US 2002/0021703 A1 Feb. 21, 2002

Related U.S. Application Data

(63) Continuation of application No. 09/614,715, filed on Jul. 12, 2000, now Pat. No. 6,690,669, which is a continuation of application No. 08/959,462, filed on Oct. 28, 1997, now Pat. No. 6,118,784.

(30) Foreign Application Priority Data

Nov. 1, 1996 (JP) ............................................. 8-291480
Aug. 7, 1997 (JP) ............................................. 9-212889

(51) Int. Cl.
*H04L 12/28* (2006.01)

(52) U.S. Cl. .................. 370/392; 370/401; 370/466
(58) Field of Classification Search ................ 370/338, 370/401, 402, 389, 392, 465, 466, 475; 709/229, 709/249, 227, 245
See application file for complete search history.

(56) References Cited

U.S. PATENT DOCUMENTS 6,038,233 A 3/2000 Hamadoto et al.
6,118,784 A 9/2000 Tsuchiya et al.

OTHER PUBLICATIONS

Request for Comments (RFC) 791, 1034, 1541, 1883, 1884, 1886 and 1918 issued by Internet Engineering Task Force (IETF).

"Transition Mechanisms for Plv6 Hosts and Routers", Network Working Group, RFC 1933, HTTP://DS.INTERNIC.NET/RFC/RFC1933.TXT, R. Gilligan et al, Apr. 1996, pp. 1–22.

Communications of the Association for Computing Machinery, vol. 39, No. 6, Jun. 1996, "IP Next Generation Overview", R. Hinden, pp. 61–71.

(Continued)

*Primary Examiner*—Duc Ho
*Assistant Examiner*—Phuongchau Ba Nguyen
(74) *Attorney, Agent, or Firm*—Mattingly, Stanger, Malur & Brundidge, P.C.

(57) ABSTRACT

In an apparatus, there are provided an IP transmitting and receiving unit for transmitting and receiving an IPv4 packet and an IPv6 packet; an IP header converting unit for performing a mutual conversion of the IPv4 packet and the IPv6 packet by an IP header conversion; a DNS substituting unit for receiving a domain information capturing request sent from an IPv4 terminal or an IPv6 terminal and substituting its process; an IPv4 address capturing unit for capturing an IPv4 address from a DHCP server; and an IP address conversion information holding unit for holding an IPv6 address of the IPv6 terminal and the IPv4 address captured by the IPv4 address capturing unit in correspondence to each other. Thus, a communication with the IPv4 terminal can be executed without preliminarily fixedly allocating the IPv4 address to the IPv6 terminal.

28 Claims, 21 Drawing Sheets

OTHER PUBLICATIONS

IBM Systems Journal, vol. 34, No. 3, Jun. 21, 1995, "TCP/IP: The Next Generation", E.G. Britton et al, pp. 452–470.

R. Callon et al, "Routing Aspects of IPv6 Transition", www.rfc-editor.org, Sep. 1999.

G. Tsirtsis et al, "Network Address Translation–Protocol Translation (NAT–PT)", www.rfc-editor.org, Feb. 2000.

R. Coltun et al, "OSPF for IPv6", www.rfc-editor.org, Sep. 1999.

M. Takamura et al, "A Seamless Interconnection Technique for IPv4/IPv6 Internets", Technical Report of Information Processing Society of Japan, vol. 96, No. 95, Sep. 27, 1996, pp. 79–84.

FIG. 2

| ITEM NO. | IPv4 ADDRESS ALLOCATED TEMPORARILY TO TERMINAL IN IPv6 NETWORK | IPv6 ADDRESS OF TERMINAL IN IPv6 NETWORK |
|---|---|---|
| 1 | 1 3 3 . 1 4 4 . 9 5 . 1 | 1 : : 1 |
| 2 | | |
| n | ---- | ---- |

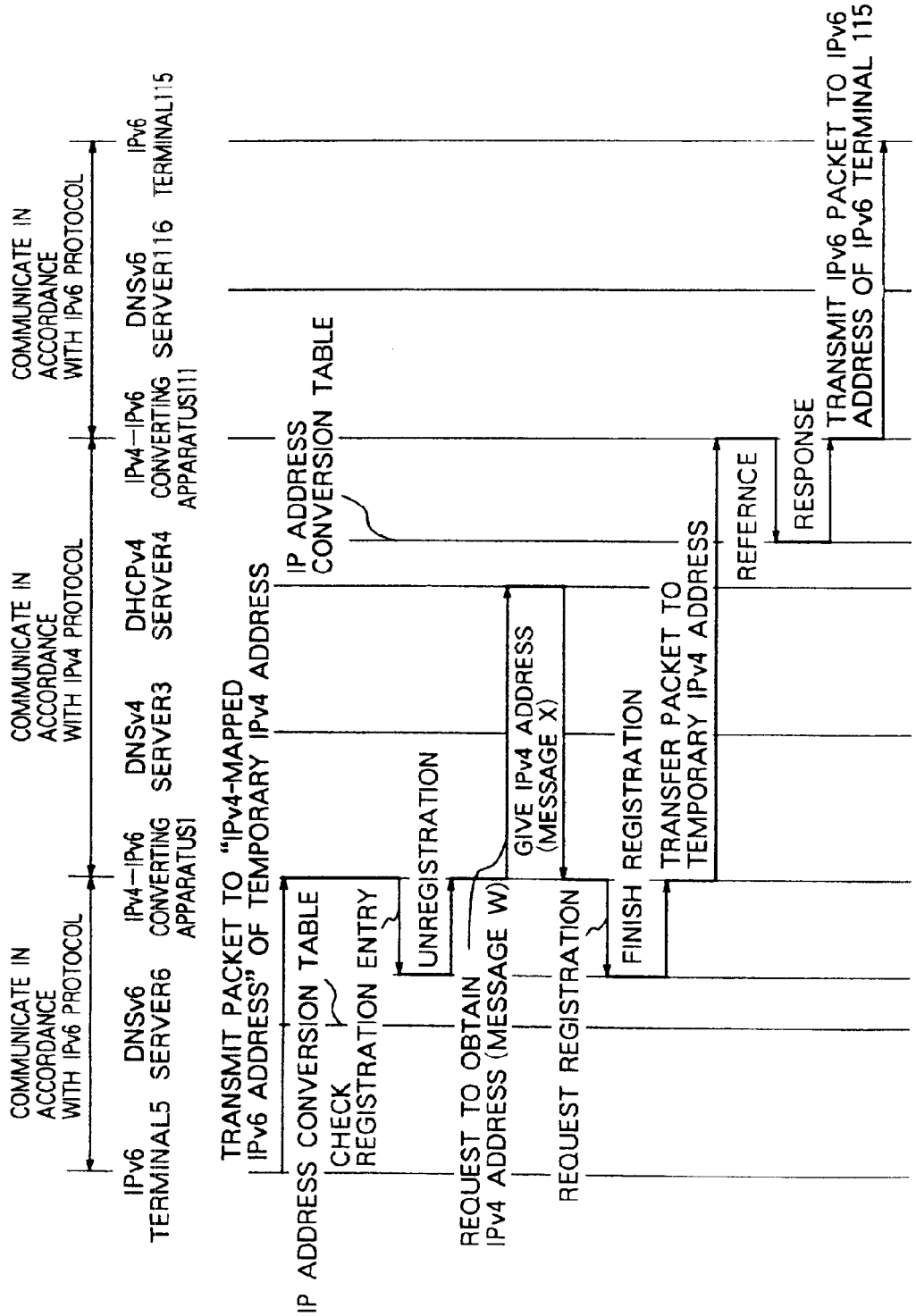

COMMUNICATING METHOD BETWEEN IPV4 TERMINAL AND IPV6 TERMINAL AND IPV4-IPV6 CONVERTING APPARATUS

This is a continuation application of U.S. Ser. No. 09/614,715, filed Jul. 12, 2000 now U.S. Pat. No. 6,690,669, which is a continuation application of U.S. Ser. No. 08/959,462, filed Oct. 28, 1997, now U.S. Pat. No. 6,118,784.

BACKGROUND OF THE INVENTION

The present invention relates to a communicating method between an IPv4 terminal and an IPv6 terminal and to an IPv4-IPv6 converting apparatus. More particularly, the invention relates to method and apparatus for realizing a communication between an IPv4 terminal using IPv4 (Internet Protocol version 4) as a communication protocol and an IPv6 terminal using IPv6 (Internet Protocol version 6) as a communication protocol.

As a method of realizing a communication between an IPv4 terminal and an IPv6 terminal, there is a method of using an 'IPv4-mapped IPv6 address' and an 'IPv4-compatible IPv6 address' described in RFC (Request For Comments) 1884 issued by IETF (Internet Engineering Task Force).

The 'IPv4-mapped IPv6 address' is an IPv6 address in which "0" is set to the 127th to 48th bits among 128 bits of the IPv6 address, "1" is set to the 47th to 32nd bits, and an 'IPv4 address' is set to the 31st to 0th bits.

The 'IPv4-compatible IPv6 address' is an IPv6 address in which "0" is set to the 127th to 32nd bits among 128 bits of the IPv6 address and the 'IPv4 address' is set to the 31st to 0th bits.

When the communication between the IPv4 terminal and the IPv6 terminal is executed, an IPv4 address is preliminarily fixedly allocated to the IPv6 terminal which communicates with the IPv4 terminal. A packet converting apparatus is provided on the way of a path through which the IPv4 terminal and the IPv6 terminal communicate and a mutual conversion of IP headers of an IPv4 packet (RFC791) and an IPv6 packet (RFC1883) is performed.

In an IPv4 network, the IPv4 address of the IPv4 terminal and the IPv4 address allocated to the IPv6 terminal are used and a communication is executed by using the IPv4 packet. In an IPv6 network, the 'IPv4 mapped IPv6 address' in which the 'IPv4 address of the IPv4 terminal' has been set is used as an IPv6 address of the IPv4 terminal. In the IPv6 network, the 'IPv4 compatible IPv6 address' in which the 'IPv4 address allocated to the IPv6 terminal' has been set is used as an IP address of the IPv6 terminal and a communication is executed by using the IPv6 packet.

The packet converting apparatus converts the 'IPv4-mapped IPv6 address' included in the IPv6 packet into the 'IPv4 address of the IPv4 terminal' and converts the 'IPv4-compatible IPv6 address' to the 'IPv4 address allocated to the IPv6 terminal, thereby converting the IPv6 packet into the IPv4 packet. Contrarily, the 'IPv4 address of the IPv4 terminal' included in the IPv4 packet is converted into the 'IPv4 mapped IPv6 address' and the 'IPv4 address allocated to the IPv6 terminal' is converted into the 'IPv4 compatible IPv6 address', thereby converting the IPv4 packet into the IPv6 packet. Consequently, the communication between the IPv4 terminal and the IPv6 terminal can be executed.

As a method of realizing the communication between the IPv4 terminal and the IPv6 terminal, IETF also proposed a method called a dual stack. According to the method, the IPv6 terminal has both of the communication protocols of IPv4 and IPv6. A communication is executed between the IPv6 terminals by using the IPv6 protocol. A communication is executed between the IPv4 terminals by using the IPv4 protocol. Thus, the communication between the IPv4 terminal and the IPv6 terminal can be executed.

IETF also proposed a method called an IP tunneling. This is a method such that when the IPv4 network exists on a communication path between two IPv6 terminals and a communication cannot be executed directly by the IPv6 packet, the IPv6 packet is encapsulated by the IPv4 header and is allowed to pass through the IPv4 network. Similarly, when the IPv6 network exists on a communication path between the IPv4 terminals and a communication cannot be executed directly by the IPv4 packet, the IPv4 packet is encapsulated by the IPv6 header and is allowed to pass through the IPv6 network. Consequently, even when there is the IPv4 network on the communication path, the communication between the IPv6 terminals can be executed. Even when there is the IPv6 network on the communication path, the communication between the IPv4 terminals can be executed.

According to the method, the communication between the IPv4 terminal and the IPv6 terminal can be realized by a simple operation of adding a fixed pattern of 96 bits to the IPv4 address or deleting the fixed pattern of 96 bits from the IPv6 address.

According to the method called a dual stack, by selectively using the communication protocols of IPv4 and IPv6 in accordance with a communication partner, the communication between the IPv4 terminal and the IPv6 terminal can be realized.

According to the method called an IP tunneling, by encapsulating the packet by the header of the relevant communication protocol and passing the resultant data through the network existing on the communication path between the two terminals, the communication between the two terminals can be realized.

SUMMARY OF THE INVENTION

The convention techniques, however, have the following problems.

A first problem is that the IPv4 address has to be fixedly allocated to all of the IPv6 terminals which have a possibility of communication with the IPv4 terminal. This further consumes the IPv4 address which is short and accelerates its shortage.

A second problem is that since mutual domain information (for example, an IP address corresponding to a domain name) cannot be referred to between the IPv4 network and the IPv6 network, the partner can be designated not by the domain name but by only an actual IP address. This results in that the communication partners have to be mutually aware whether the partner uses IPv4 or IPv6 as a communication protocol.

A third problem is that, in the method called a dual stack, the IPv4 protocol is provided for all of the IPv6 terminals having the possibility of communication with the IPv4 terminal and the IPv4 address has to be fixedly allocated. This results in that a larger memory capacity is necessary as compared with that in case of providing only the IPv6 protocol and, in a manner similar to the first problem, the IPv4 address which is short is further consumed and the shortage is accelerated.

A fourth problem is that, in the method called an IP tunneling, when the IPv4 network exists on the communication path between the two IPv6 terminals, in order to pass the IPv6 packet by encapsulating it by the IPv4 header, a setting for it has to be preliminarily performed. Similarly, when the IPv6 network exists on the communication path between the two IPv4 terminals, in order to pass the IPv4 packet by encapsulating it by the IPv6 header, a setting for it has to be preliminarily performed. The method can be used only between the terminals in which the setting of the IP tunneling has preliminarily been performed. The communication cannot be executed between the terminals in which the setting is not preliminarily performed.

It is, therefore, an object of the invention to provide method and apparatus in which only an IPv6 protocol is provided for an IPv6 terminal, even if an IPv4 address is not preliminarily fixedly allocated, a communication between an IPv4 terminal and the IPv6 terminal can be executed, a partner is designated not by an IP address but by a domain name, and the communication between the IPv4 terminal and the IPv6 terminal can be executed.

According to the first aspect, in a communication network system comprising an IPv4 network, an IPv6 network; and an IPv4-IPv6 converting apparatus connected to both of them, an IPv4 terminal of the IPv4 network inquires an IP address for a domain name of an IPv6 terminal of the IPv6 network to the IPv4-IPv6 converting apparatus. Thus, the IPv4-IPv6 converting apparatus obtains the IPv6 address corresponding to the domain name from a DNS (Domain Name System) v6 server apparatus for managing domain information of the IPv6 network, dynamically acquires the IPv4 address corresponding to the IPv6 address from a DHCP (Dynamic Host Configuration Protocol) v4 server apparatus for dynamically allocating the IPv4 address, and notifies to the IPv4 terminal. The IPv4 terminal forms an IPv4 packet by setting an own IPv4 address to an IPv4 source address and by setting the notified IPv4 address to an IPv4 destination address and sends the IPv4 packet to the IPv4-IPv6 converting apparatus. The IPv4-IPv6 converting apparatus converts the IPv4 source address included in the received IPv4 packet into an IPv6 source address by adding fixed data to the IPv4 source address and converts an IPv4 destination address included in the IPv4 packet into the IPv6 address corresponding to the IPv4 destination address, thereby obtaining an IPv6 destination address, forming an IPv6 packet from the IPv4 packet, and sending the IPv6 packet to the IPv6 network. The IPv6 terminal forms the IPv6 packet by setting the own IPv6 address to the IPv6 source address and setting the IPv6 source address included in the received IPv6 packet to the IPv6 destination address, and transmits the IPv6 packet to the IPv4-IPv6 converting apparatus. The IPv4-IPv6 converting apparatus deletes the fixed data from the IPv6 destination address included in the received IPv6 packet, converts the resultant IPv6 destination address to the IPv4 destination address, and converts the IPv6 source address included in the IPv6 packet to the IPv4 address corresponding to the IPv6 source address, thereby obtaining the IPv4 source address, forming the IPv4 packet from the IPv6 packet, and transmitting the IPv4 packet to the IPv4 network.

In the communicating method between the IPv4 terminal and the IPv6 terminal according to the first aspect, when the communication from the IPv4 terminal side of the IPv4 network to the IPv6 terminal of the IPv6 network is started, the IPv4 address is dynamically allocated to the IPv6 terminal of the IPv6 network. Consequently, it is unnecessary to preliminarily fixedly allocate the IPv4 address to the IPv6 terminal, so that the consumption of the IPv4 address can be suppressed. Since the IPv4-IPv6 converting apparatus automatically obtains the IP address for the domain name of the IPv6 terminal from the DNSv6 server apparatus, the IPv4 terminal can designate the domain name and communicate with the IPv6 terminal.

According to the second aspect, in a communication network system comprising an IPv4 network, an IPv6 network, and an IPv4-IPv6 converting apparatus connected to both of them, an IPv6 terminal of the IPv6 network inquires an IP address for a domain name of an IPv4 terminal of the IPv4 network to the IPv4-IPv6 converting apparatus. Thus, the IPv4-IPv6 converting apparatus acquires an IPv4 address corresponding to the domain name from a DNSv4 server apparatus for managing domain information of the IPv4 network, converts the IPv4 address to the IPv6 address by adding fixed data to the IPv4 address, and notifies the IPv6 terminal of the IPv6 address. The IPv6 terminal forms an IPv6 packet by setting an own IPv6 address to an IPv6 source address and setting the notified IPv6 address to an IPv6 destination address and transmits the IPv6 packet to the IPv4-IPv6 converting apparatus. The IPv4-IPv6 converting apparatus deletes the fixed data from the IPv6 destination address included in the received IPv6 packet and converts the resultant IPv6 destination address to an IPv4 destination address, dynamically acquires the IPv4 address corresponding to the IPv6 source address included in the IPv6 packet from a DHCPv4 server apparatus for dynamically allocating the IPv4 address, forms the IPv4 packet from the IPv6 packet by using the IPv4 address, and transmits the IPv4 packet to the IPv4 network. The IPv4 terminal forms the IPv4 packet by setting the own IPv4 address to an IPv4 source address and setting the IPv4 source address included in the received IPv4 packet to an IPv4 destination address and transmits the IPv4 packet to the IPv4-IPv6 converting apparatus. The IPv4-IPv6 converting apparatus converts the IPv4 source address to the IPv6 source address by adding fixed data to the IPv4 source address, obtains the IPv6 destination address by converting the IPv4 destination address included in the IPv4 packet to the IPv6 address corresponding to the IPv4 destination address, forms the IPv6 packet from the IPv4 packet, and transmits the IPv6 packet to the IPv6 network.

In the communicating method between the IPv4 terminal and the IPv6 terminal according to the second aspect, when the communication from the IPv6 terminal side of the IPv6 network to the IPv4 terminal of the IPv4 network is started, the IPv4 address is dynamically allocated to the IPv6 terminal of the IPv6 network. Consequently, it is unnecessary to preliminarily fixedly allocate the IPv4 address to the IPv6 terminal, so that the consumption of the IPv4 address can be suppressed. Since the IPv4-IPv6 converting apparatus automatically obtains the IP address for the domain name of the IPv4 terminal from the DNSv4 server apparatus, the IPv6 terminal can designate the domain name and communicate with the IPv4 terminal.

BRIEF DESCRIPTION OF THE DRAWINGS

FIG. 2 is a constructional diagram of an IP address conversion table;

FIG. 21 is a flowchart which is continuous to FIG. 20.

DESCRIPTION OF THE PREFERRED EMBODIMENTS

Embodiments of the present invention will now be described hereinbelow with reference to the drawings.

(A) First Embodiment

Figure 1:
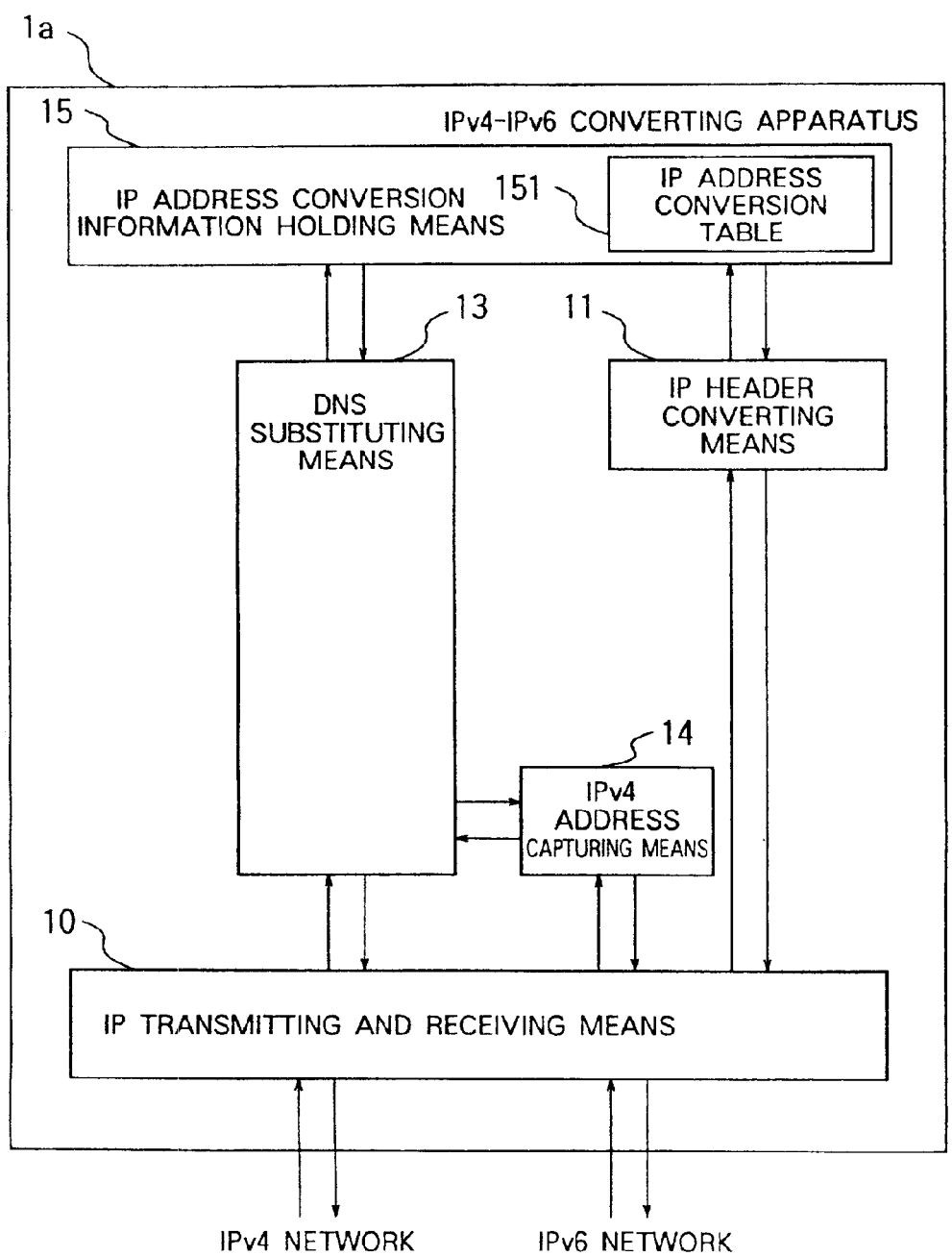
FIG. 1 is a constructional diagram of an IPv4-IPv6 converting apparatus according to the first embodiment of the invention.

FIG. 1 is a constructional diagram of an IPv4-IPv6 converting apparatus 1a according to the first embodiment of the invention.

The IPv4-IPv6 converting apparatus 1a is located between an IPv4 network and an IPv6 network and realizes a communication between an IPv4 terminal and an IPv6 terminal by performing an IP header conversion of an IPv4 packet and an IPv6 packet. The IPv4-IPv6 converting apparatus 1a comprises IP transmitting and receiving means 10, IP header converting means 11, DNS substituting means 13, IPv4 address capturing means 14, and IP address conversion information holding means 15.

The IP transmitting and receiving means 10 is means for transmitting and receiving the IPv4 packet and IPv6 packet between the IPv4 network and the IPv6 network and is constructed by, for example, electronic devices such as CPU, RAM, and the like.

The IP header converting means 11 is means for performing an IP header conversion of the IPv4 packet and the IPv6 packet and is constructed by, for example, electronic devices such as CPU, RAM, and the like.

The DNS substituting means 13 is means for capturing domain information from a DNS server in the IPv4 network or a DNS server in the IPv6 network in accordance with the DNS technique disclosed in RFC1034, RFC1886, or the like and is constructed by, for example, electronic devices such as CPU, RAM, and the like.

The IPv4 address capturing means 14 is means for capturing an IPv4 address from a DHCP server in the IPv4 network in accordance with the DHCP technique disclosed in RFC1541 or the like and is constructed by, for example, electronic devices such as CPU, RAM, and the like.

The IP address conversion information holding means 15 is means for converting the IPv4 address and the IPv6 address and is constructed by, for example, electronic devices such as an RAM and the like. A correspondence between the IPv4 address and the IPv6 address is held as an IP address conversion table 151.

FIG. 2 is a constructional diagram of the IP address conversion table 151. IPv6 addresses of the IPv6 terminal communicating with the IPv4 terminal and IPv4 addresses which are dynamically allocated in correspondence to them have been registered in the IP address conversion table 151.

Figure 3:
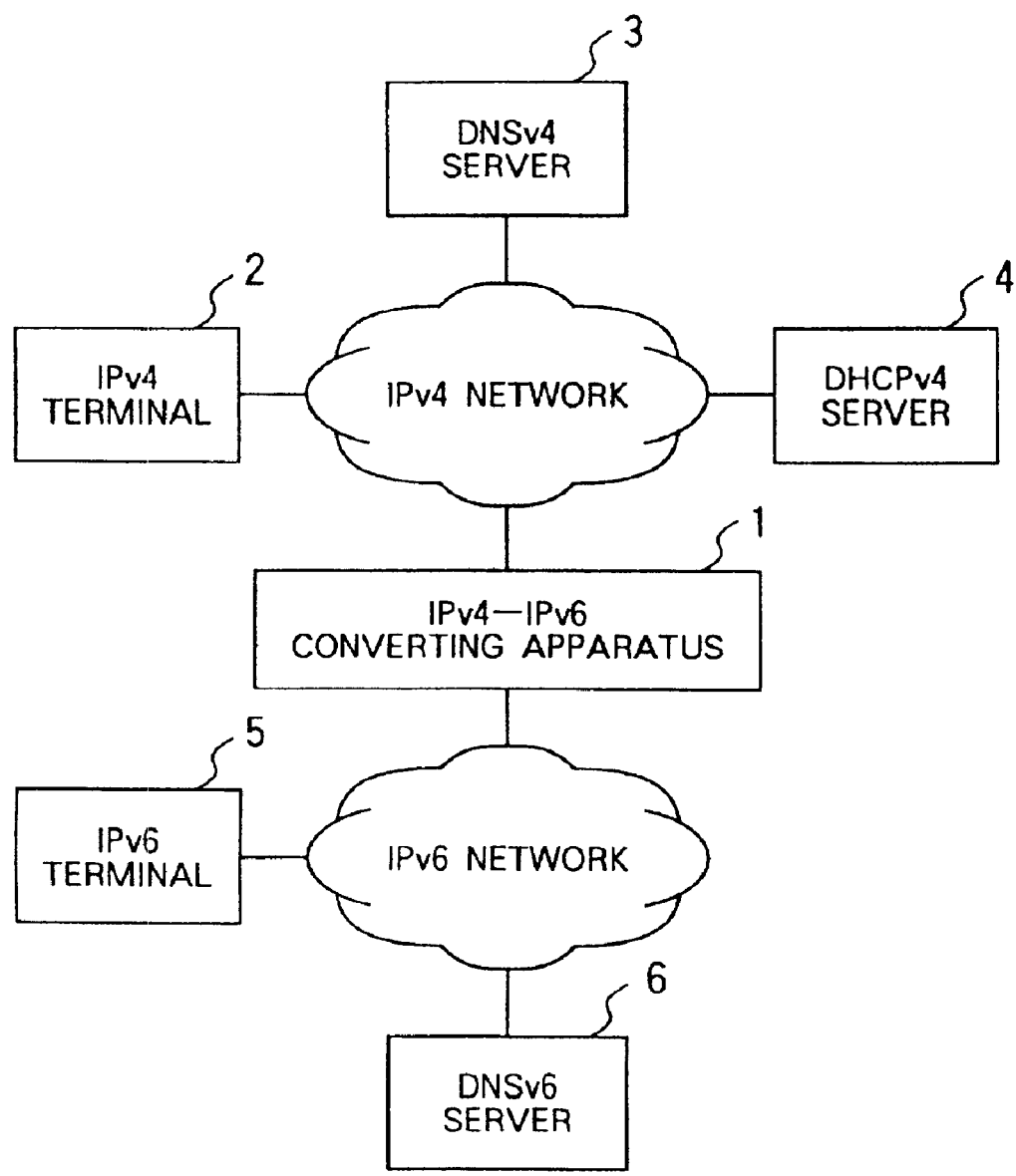
FIG. 3 is a constructional diagram of a communication network system according to the first embodiment of the invention.

FIG. 3 is a diagram of a communication network system 100 connecting an IPv4 network 104 and an IPv6 network 106 through the IPv4-IPv6 converting apparatus 1a.

In addition to an IPv4 terminal 2, a DNSv4 server 3 for managing domain information in the IPv4 network 104 and a DHCPv4 server 4 for dynamically allocating the IPv4 addresses to terminals in the IPv4 network 104 are connected to the IPv4 network 104.

In addition to an IPv6 terminal 5, a DNSv6 server 6 for managing domain information in the IPv6 network is connected to the IPv6 network 106.

It is now assumed that "133. 144. 95. 101" has been allocated as an IPv4 address to the IPv4 terminal 2 and "1 : : 1" has been allocated as an IPv6 address to the IPv6 terminal 5. It is also assumed that 100 IPv4 addresses of "133. 144. 95. 1" to "133. 144. 95. 100" have been pooled in the DHCPv4 server 4. It is also assumed that the IPv4-IPv6 converting apparatus 1a has been set as a DNS server into the IPv4 terminal 2 and IPv6 terminal 5. Further, it is assumed that the DNSv4 server 3 and DNSv6 server 6 have been set as DNS servers and the DHCPv4 server 4 has been set as a DHCP server into the IPv4-IPv6 converting apparatus 1a.

In FIG. 3, although the IPv4 network 104 and IPv6 network 106 are perfectly separated, a similar construction is also applied to a case where the IPv4 network and IPv6 network physically mixedly exist in the same network.

Figure 4:
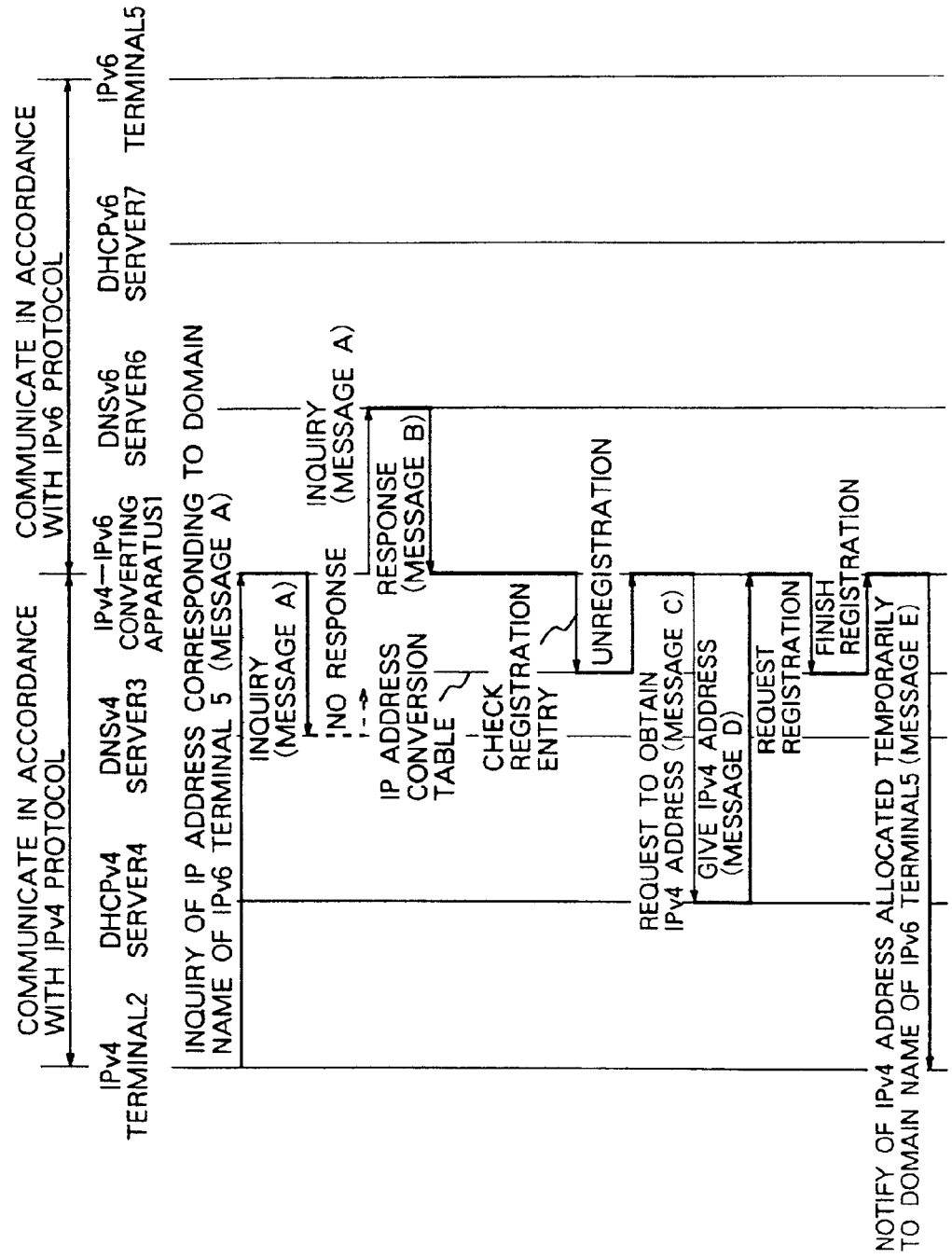
FIG. 4 is a flowchart in case of starting a communication from an IPv4 terminal to an IPv6 terminal through the IPv4-IPv6 converting apparatus according to the first embodiment of the invention.
Figure 5:
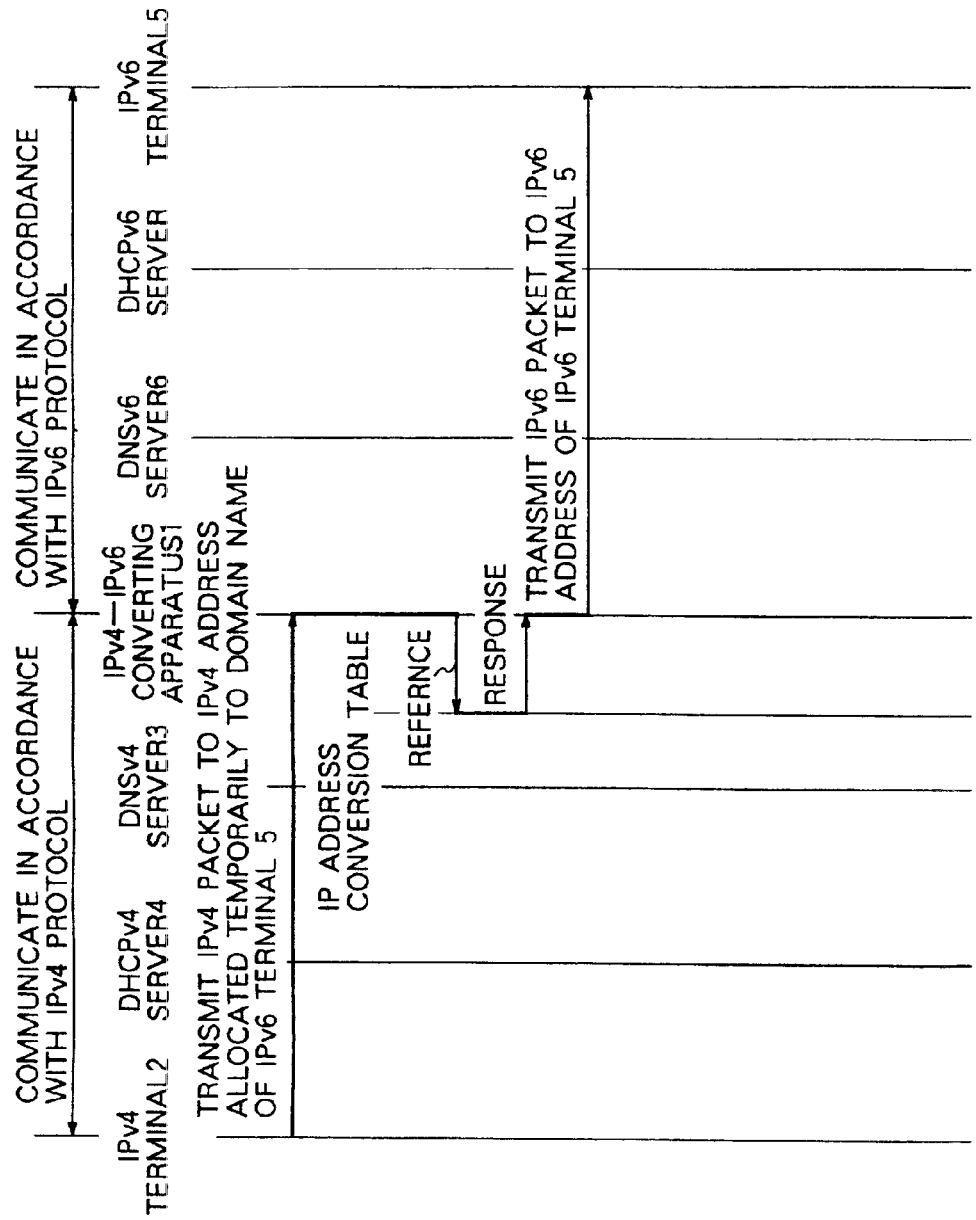
FIG. 5 is a flowchart which is continuous to FIG. 4.

FIGS. 4 and 5 are flowcharts of the operation in case of starting a communication from the IPv4 terminal 2 to the IPv6 terminal 5.

Although the IPv4 terminal 2 knows a domain name of the IPv6 terminal 5, it doesn't know an IP address. As shown in FIG. 4, therefore, after the IPv4 terminal 2 transmitted an inquiry message (hereinafter, called a 'message A') of the IP address corresponding to the domain name of the IPv6 terminal 5 to the IPv4-IPv6 converting apparatus 1a via the IPv4 network 104, it waits for a response for a predetermined time.

The IP transmitting and receiving means 10 of the IPv4-IPv6 converting apparatus 1a receives and processes the message A and sends it to the DNS substituting means 13. The DNS substituting means 13 instructs the IP transmitting and receiving means 10 so as to transfer the message A to the DNSv4 server 3, sends the message A thereto, and after that, waits for a response for a predetermined time. The IP transmitting and receiving means 10 transfers the message A to the DNSv4 server 3 via the IPv4 network.

The DNSv4 server 3 which received the message A retrieves the domain information of the IPv6 terminal 5. When it is not registered, however, a response to the message A is not returned.

The DNS substituting means 13 which didn't receive the response from the DNSv4 server 3 even after the elapse of a predetermined time instructs the IP transmitting and receiving means 10 so as to transfer the message A to the DNSv6 server 6, sends the message A thereto, and after that, waits for a response for a predetermined time. The IP transmitting and receiving means 10 transfers the message A to the DNSv6 server 6 via the IPv6 network.

The DNSv6 server 6 which received the message A retrieves the domain information of the IPv6 terminal 5 and returns the registered domain information of the IPv6 terminal 5 to the IPv4-IPv6 converting apparatus 1a as a response message (hereinafter, referred to as a 'message B') for the message A.

The IP transmitting and receiving means 10 of the IPv4-IPv6 converting apparatus 1a which received the response from the DNSv6 server 6 within the predetermined time sends the received message B to the DNS substituting means 13. The DNS substituting means 13 obtains the IPv6 address (1 : : 1) corresponding to the domain name of the IPv6 terminal 5 from the message B and sends it to the IP address conversion information holding means 15. The IP address conversion information holding means 15 retrieves the IP address conversion table 151 by using the IPv6 address (1 : : 1) of the IPv6 terminal 5 as a key. If the relevant entry has been registered, the IPv4 address of the entry is returned to the DNS substituting means 13. On the other hand, when the relevant entry is not registered yet, such a fact is notified to the DNS substituting means 13.

The DNS substituting means 13 which received the IPv4 address from the IP address conversion information holding means 15 forms a message (hereinafter, referred to as a 'message E') to notify of the IPv4 address as an IPv4 address corresponding to the domain name of the IPv6 terminal 5 and sends it to the IP transmitting and receiving means 10. The IP transmitting and receiving means 10 transmits the message E to the IPv4 terminal 2 via the IPv4 network.

On the other hand, the DNS substituting means 13 which received the notification indicating that the entry is not registered yet from the IP address conversion information holding means 15 instructs the IPv4 address capturing means 14 so as to capture the IPv4 address and, after that, waits for a response for a predetermined time. The IPv4 address capturing means 14 forms an IPv4 address capturing message (hereinafter, called a 'message C'), instructs the IP transmitting and receiving means 10 so as to transfer the message C to the DHCPv4 server 4, sends the message C thereto, and after that, waits for a response for a predetermined time. The IP transmitting and receiving means 10 transmits the message C to the DHCPv4 server 4 via the IPv4 network.

The DHCPv4 server 4 which received the message C gives the IPv4 address to the IPv6 address (1 : : 1) of the IPv6 terminal 5 (it is now assumed that "133. 144. 95. 1" has been given) and returns an IPv4 address given message (hereinafter, called a 'message D').

The IP transmitting and receiving means 10 which received the message D sends the message D to the IPv4 address capturing means 14. The IPv4 address capturing means 14 obtains the IPv4 address (133. 144. 95. 1) from the message D and notifies the DNS substituting means 13. The DNS substituting means 13 forms the message E to notify of the IPv4 address (133. 144. 95. 1) as an IP address corresponding to the domain name of the IPv6 terminal 5 and sends it to the IP transmitting and receiving means 10. The IP transmitting and receiving means 10 transmits the message E to the IPv4 terminal 2 via the IPv4 network. The DNS substituting means 13 sends the IPv4 address (133. 144. 95. 1) captured from the DHCPv4 server 4 to the IP address conversion information holding means 15 in correspondence to the IPv6 address (1 : : 1) of the IPv6 terminal 5. The IP address conversion information holding means 15 forms a new entry into the IP address conversion table 151 and registers a correspondence of the IPv4 address (133. 144. 95. 1) and the IPv6 address (1 : : 1) of the IPv6 terminal 5. The entry of the IP address conversion table 151 is deleted in the case where it is not referred for a predetermined time. The IPv4 address (133. 144. 95. 1) is returned to the DHCPv4 server 4.

As shown in FIG. 5, the IPv4 terminal 2 transmits the IPv4 packet in which the IPv4 address (133. 144. 95. 1) notified from the IPv4-IPv6 converting apparatus 1a by the message E has been set into an IPv4 destination address field of the IPv4 packet and an own IPv4 address (133. 144. 95. 101) has been set into an IPv4 source address field to the IPv4-IPv6 converting apparatus 1a through the IPv4 network.

The IP transmitting and receiving means 10 of the IPv4-IPv6 converting apparatus 1a sends the received IPv4 packet to the IP header converting means 11. The IP header converting means 11 extracts the IPv4 address (133. 144. 95. 101) from the IPv4 source address field of the IPv4 packet, converts the IPv4 address into an 'IPv4-mapped IPv6 address' (: : FFFF : 133. 144. 95. 101) of 128 bits by adding a fixed pattern of 96 bits mentioned above to the IPv4 address, and sets it into an IPv6 source address field of the IPv6 packet. The IP header converting means 11 extracts the IPv4 address (133. 144. 95. 1) from the IPv4 destination address field of the IPv4 packet and sends it to the IP address conversion information holding means 15. The IP address conversion information holding means 15 obtains the IPv6 address (1 : : 1) corresponding to the IPv4 address (133. 144. 95. 1) with reference to the IP address conversion table 151 and sends it to the IP header converting means 11. The IP header converting means 11 sets the IPv6 address (1 : : 1) into an IPv6 destination address field of the IPv6 packet. The IPv6 packet formed by performing the IP header conversion as mentioned above is sent to the IP transmitting and receiving means 10. The IP transmitting and receiving means 10 transmits the IPv6 packet to the IPv6 terminal 5 through the IPv6 network.

In this manner, the communication from the IPv4 terminal 2 to the IPv6 terminal 5 can be started.

Figure 6:
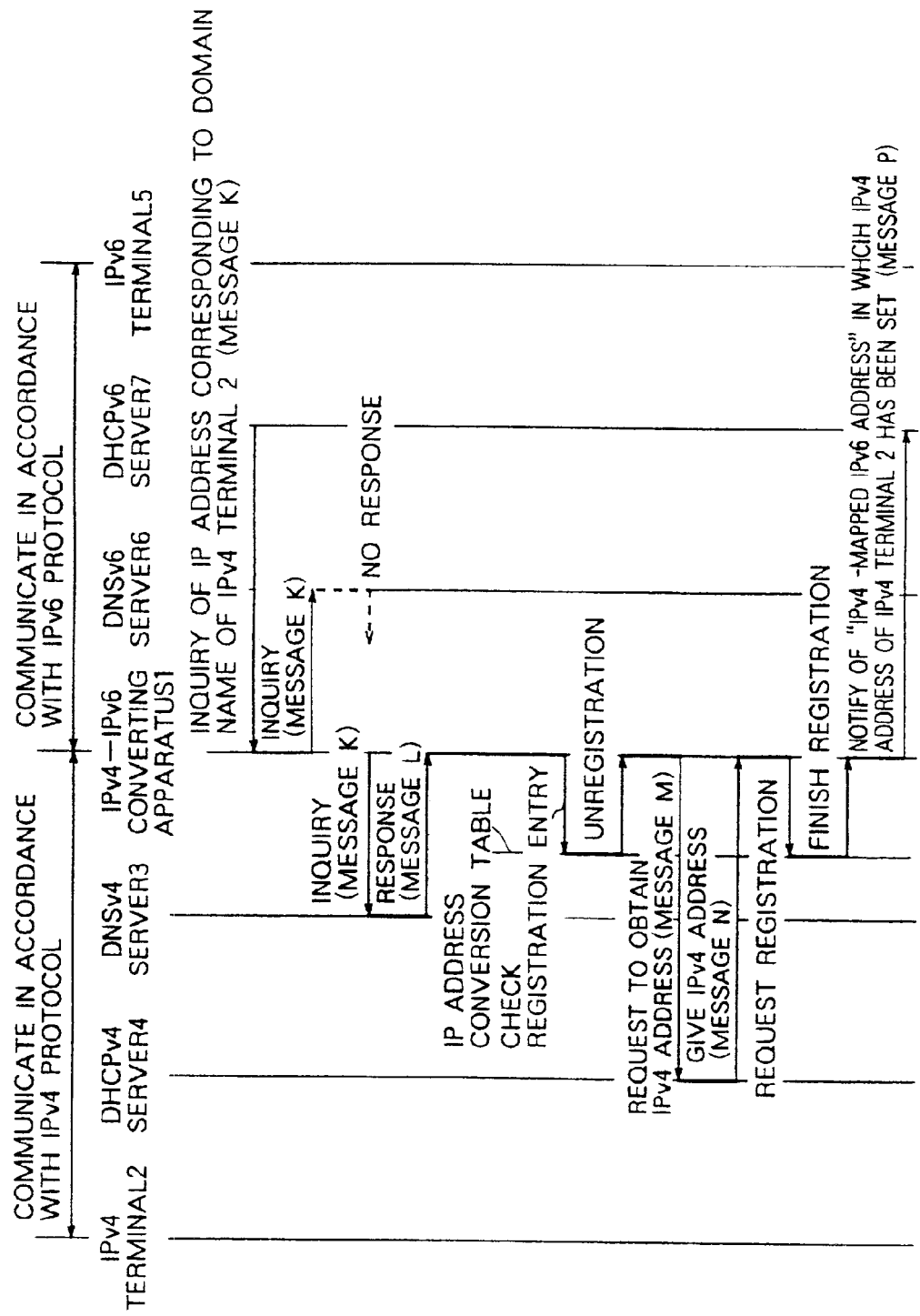
FIG. 6 is a flowchart in case of starting a communication from the IPv6 terminal to the IPv4 terminal through the IPv4-IPv6 converting apparatus according to the first embodiment of the invention.
Figure 7:
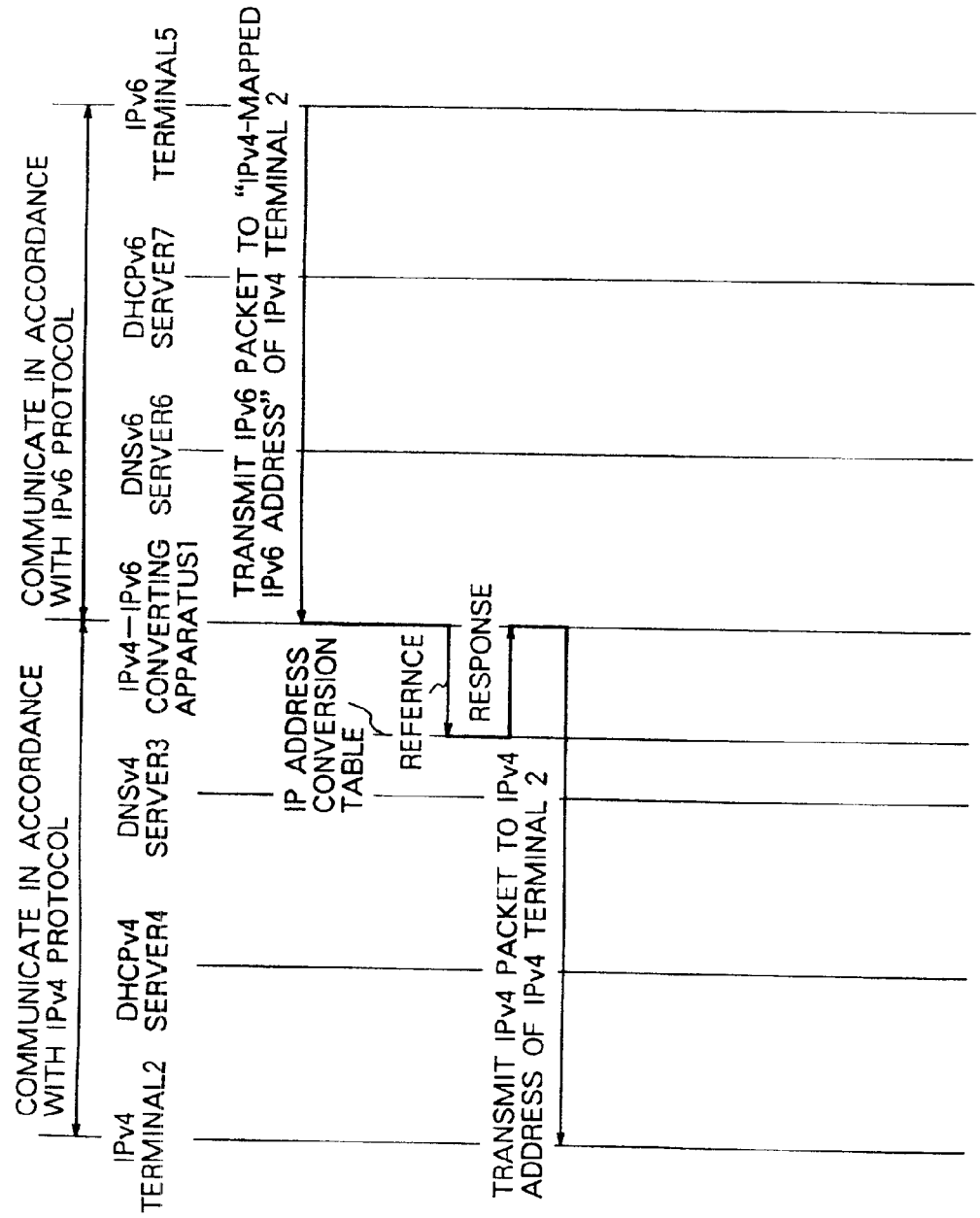
FIG. 7 is a flowchart which is continuous to FIG. 6.

FIGS. 6 and 7 are flowcharts for the operation in case of starting a communication from the IPv6 terminal 5 to the IPv4 terminal 2.

Although the IPv6 terminal 5 knows a domain name of the IPv4 terminal 2, it doesn't know the IP address. As shown in FIG. 6, therefore, the IPv6 terminal 5 transmits an inquiry message (hereinafter, called a 'message K') of an IP address corresponding to the domain name of the IPv4 terminal 2 to the IPv4-IPv6 converting apparatus 1a via the IPv6 network 106 and, after that, waits for a response for a predetermined time.

The IP transmitting and receiving means 10 of the IPv4-IPv6 converting apparatus 1a receives and processes the message K and sends it to the DNS substituting means 13. The DNS substituting means 13 instructs the IP transmitting and receiving means 10 so as to transfer the message K to the DNSv6 server 6, sends the message K thereto, and after that, waits for a response for a predetermined time. The IP transmitting and receiving means 10 transfers the message K to the DNSv6 server 6 via the IPv6 network.

The DNSv6 server 6 which received the message K retrieves the domain information of the IPv4 terminal 2. However, when it is not registered, a response to the message K is not returned.

The DNS substituting means 13 which didn't receive the response from the DNSv6 server 6 even after the elapse of a predetermined time instructs the IP transmitting and receiving means 10 so as to transfer the message K to the DNSv4 server 3, sends the message K thereto, and after that, waits for a response for a predetermined time. The IP transmitting and receiving means 10 transfers the message K to the DNSv4 server 3 via the IPv4 network.

The DNSv4 server 3 which received the message K retrieves the domain information of the IPv4 terminal 2 and returns the registered domain information of the IPv4 terminal 2 to the IPv4-IPv6 converting apparatus 1a as a response message (hereinafter, called a 'message L') for the message K.

The IP transmitting and receiving means 10 of the IPv4-IPv6 converting apparatus 1a which received the response from the DNSv4 server 3 within the predetermined time sends the received message L to the DNS substituting means 13. The DNS substituting means 13 obtains the IPv4 address (133. 144. 95. 101) corresponding to the domain name of the IPv4 terminal 2 from the message L.

Subsequently, the DNS substituting means 13 sends the IPv6 address (1 : : 1) of the IPv6 terminal 5 to the IP address conversion information holding means 15. The IP address conversion information holding means 15 retrieves the IP address conversion table 151 by using the IPv6 address (1 : : 1) of the IPv6 terminal 5 as a key and notifies the DNS substituting means 13 of information about whether the relevant entry has been registered or not.

The DNS substituting means 13 which received a notification indicating that the relevant entry is not registered yet in the IPv6 address (1 : : 1) of the IPv6 terminal 5 instructs the IPv4 address capturing means 14 so as to capture the IPv4 address and, after that, waits for a response for a predetermined time. The IPv4 address capturing means 14 forms an IPv4 address capture message (hereinafter, called a 'message M'), instructs the IP transmitting and receiving means 10 so as to transfer the message M to the DHCv4 server 4, sends the message M thereto, and after that, waits for a response for a predetermined time. The IP transmitting and receiving means 10 transmits the message M to the DHCPv4 server 4 via the IPv4 network.

The DHCPv4 server 4 which received the message M gives the IPv4 address to the IPv6 address (1 : : 1) of the IPv6 terminal 5 (it is now assumed that "133. 144. 95. 1" is given) and returns an IPv4 address given message (hereinafter, called a 'message N').

The IP transmitting and receiving means 10 which received the message N sends the message N to the IPv4 address capturing means 14. The IPv4 address capturing means 14 obtains the IPv4 address (133. 144. 95. 1) from the message N and notifies the DNS substituting means 13. The DNS substituting means 13 sends the IPv4 address (133. 144. 95. 1) captured from the DHCPv4 server 4 to the IP address conversion information holding means 15 in correspondence to the IPv6 address (1 : : 1) of the IPv6 terminal 5. The IP address conversion information holding means 15 forms a new entry into the IP address conversion table 151 and registers a correspondence of the IPv4 address (133. 144. 95. 1) and the IPv6 address (1 : : 1) of the IPv6 terminal 5. The entry in the IP address conversion table 151 is deleted when it is not referred to for a predetermined time and the IPv4 address (133. 144. 95. 1) is returned to the DHCv4 server 4.

When a notification indicating that the relevant entry has been registered in the IPv6 address (1 : : 1) of the IPv6 terminal 5 is received or when the registration of the relevant entry into the IPv6 address (1 : : 1) of the IPv6 terminal 5 is completed, the DNS substituting means 13 forms a message (hereinafter, called a 'message P') to notify of an 'IPv4-mapped IPv6 address' (: : FFFF : 133. 144. 95. 101) in which the IPv4 address (133. 144. 95. 101) of the IPv4 terminal 2 has been set as an IP address corresponding to the domain name of the IPv4 terminal 2. The DNS substituting means 13 instructs the IP transmitting and receiving means 10 so as to transfer the message P to the IPv6 terminal 5 and sends the message P thereto. The IP transmitting and receiving means 10 transmits the message P to the IPv6 terminal 5 via the IPv6 network.

As shown in FIG. 7, the IPv6 terminal 5 transmits the IPv6 packet in which the IPv6 address (: : FFFF : 133. 144. 95. 101) notified from the IPv4-IPv6 converting apparatus 1a has been set into the IPv6 destination address field of the IPv6 packet and the own IPv6 address (1 : : 1) has been set into the IPv6 source address field to the IPv4-IPv6 converting apparatus 1a through the IPv6 network.

The IP transmitting and receiving means 10 of the IPv4-IPv6 converting apparatus 1a sends the received IPv6 packet to the IP header converting means 11. The IP header converting means 11 extracts the IPv6 address (: : FFFF : 133. 144. 95. 101) from the IPv6 destination address field of the IPv6 packet, converts the IPv6 address into the IPv4 address (133. 144. 95. 101) of 32 bits by deleting the fixed pattern of 96 bits mentioned above, and sets the IPv4 address into the IPv4 destination address field of the IPv4 packet. The IP header converting means 11 extracts the IPv6 address (1 : : 1) from the IPv6 source address field of the IPv6 packet and sends it to the IP address conversion information holding means 15. The IP address conversion information holding means 15 obtains the IPv4 address (133. 144. 95. 1) corresponding to the IPv6 address (1 : : 1) with reference to the IP address conversion table 151 and sends it to the IP header converting means 11. The IP header converting means 11 sets the IPv4 address (133. 144. 95. 1) into the IPv4 source address field of the IPv4 packet. The IPv4 packet formed by performing the IP header conversion as mentioned above is sent to the IP transmitting and receiving means 10. The IP transmitting and receiving means 10 transmits the IPv4 packet to the IPv4 terminal 2 through the IPv4 network.

In this manner, the communication from the IPv6 terminal 5 to the IPv4 terminal 2 can be started.

Although the case where the IPv4 domain information had been registered in the DNSv4 server 3 has been described above, the IPv4 domain information can be also registered in the DNSv6 server 6. In this case, the IPv4-IPv6 converting apparatus 1a captures the IPv4 domain information by communicating with the DNSv6 server 6 by using the IPv6 protocol. Similarly, the IPv6 domain information can be also registered in the DNSv4 server 3. In this case, the IPv4-IPv6 converting apparatus 1a captures the IPv6 domain information by communicating with the DNSv4 server 3 by using the IPv4 protocol.

Explanation has been made with respect to the case where the address conversion is performed solely in the address field by adding or deleting the fixed pattern of 96 bits mentioned above or by referring to the IP address conversion table 151. As for the address on the terminal side which started the communication, however, a combination of the address on the terminal side which started the communication and the port number of a TCP (Transmission Control Protocol)/UDP (User Datagram Protocol) can be also converted to a combination of an address of the IPv4-IPv6 converting apparatus and a port number of the TCP/UDP by using a method called an IP masquerade.

Figure 8:
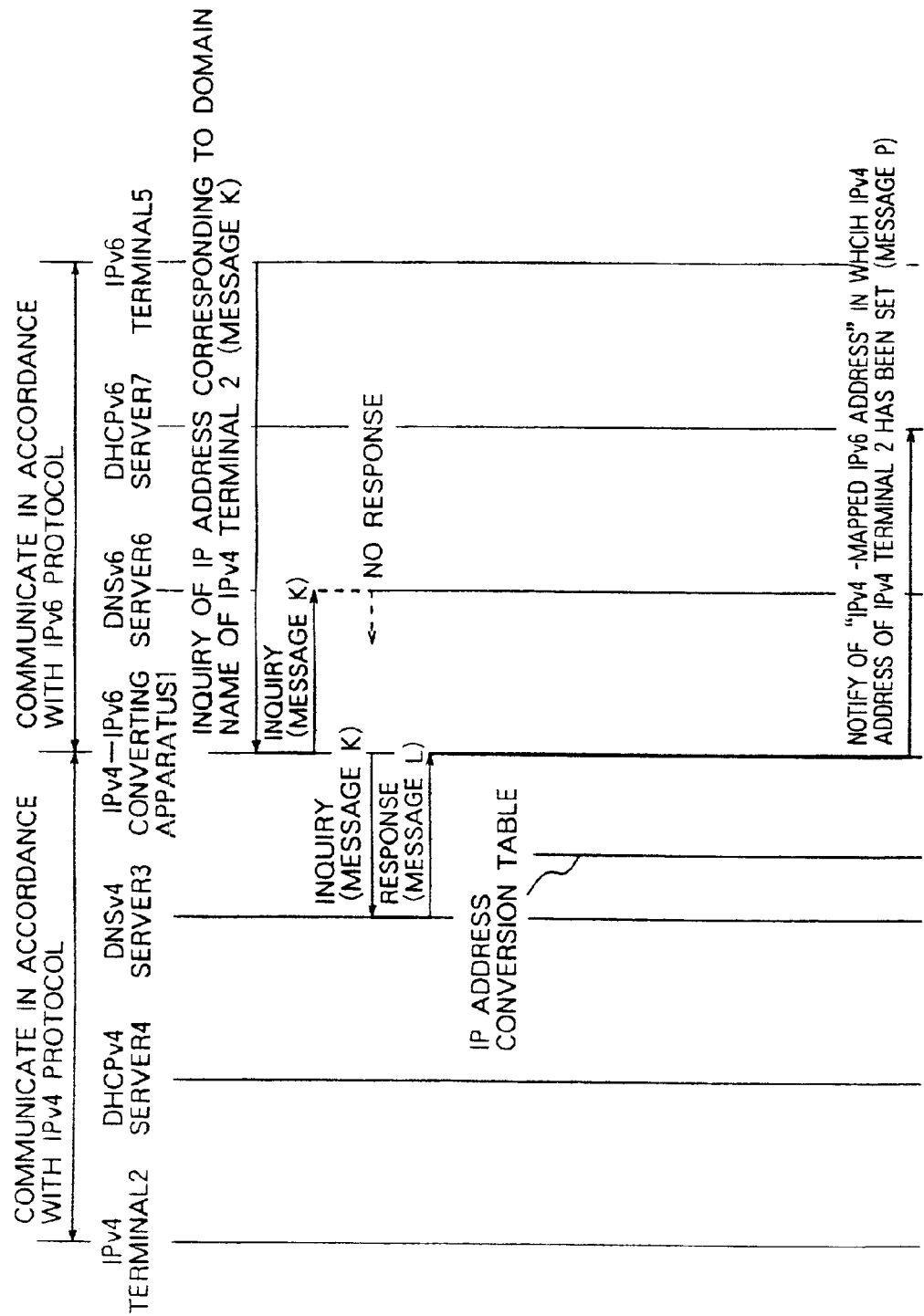
FIG. 8 is a flowchart in another case of starting a communication from the IPv6 terminal to the IPv4 terminal.
Figure 9:
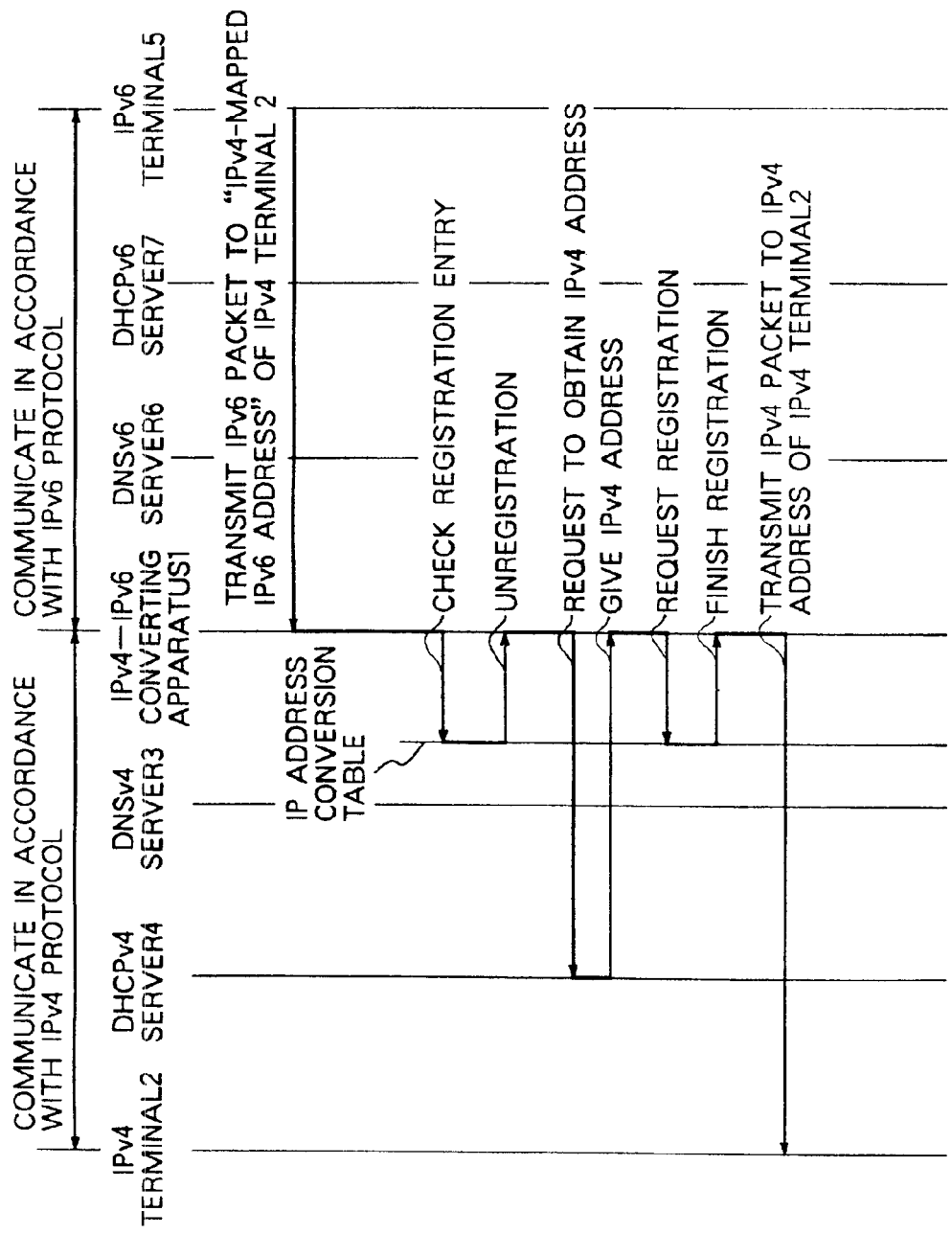
FIG. 9 is a flowchart which is continuous to FIG. 8.

FIGS. 8 and 9 are flowcharts for operation in another case of starting a communication from the IPv6 terminal 5 to the IPv4 terminal 2. This case has a feature in that temporary allocation of IPv4 address to the IPv6 terminal is performed at the time of actually starting a data communication.

Although the IPv6 terminal 5 knows a domain name of the IPv4 terminal 2, it doesn't know the IP address. As shown in FIG. 8, therefore, the IPv6 terminal 5 transmits an inquiry message (hereinafter, called a 'message K') of an IP address corresponding to the domain name of the IPv4 terminal 2 to the IPv4-IPv6 converting apparatus 1a via the IPv6 network 106 and, after that, waits for a response for a predetermined time.

The IP transmitting and receiving means 10 of the IPv4-IPv6 converting apparatus 1a receives and processes the message K and sends it to the DNS substituting means 13. The DNS substituting means 13 instructs the IP transmitting and receiving means 10 so as to transfer the message K to the DNSv6 server 6, sends the message K thereto, and after that, waits for a response for a predetermined time. The IP transmitting and receiving means 10 transfers the message K to the DNSv6 server 6 via the IPv6 network.

The DNSv6 server 6 which received the message K retrieves the domain information of the IPv4 terminal 2. However, when it is not registered, a response to the message K is not returned.

The DNS substituting means 13 which didn't receive the response from the DNSv6 server 6 even after the elapse of a predetermined time instructs the IP transmitting and receiving means 10 so as to transfer the message K to the DNSv4 server 3, sends the message K thereto, and after that, waits for a response for a predetermined time. The IP transmitting and receiving means 10 transfers the message K to the DNSv4 server 3 via the IPv4 network.

The DNSv4 server 3 which received the message K retrieves the domain information of the Ipv4 terminal 2 and returns the registered domain information of the IPv4 terminal 2 to the IPv4-IPv6 converting apparatus 1a as a response message (hereinafter, called a 'message L') for the message K.

The IP transmitting and receiving means 10 of the IPv4-IPv6 converting apparatus 1a which received the response from the DNSv4 server 3 within the predetermined time sends the received message L to the DNS substituting means 13. The DNS substituting means 13 obtains the IPv4 address (133. 144. 95. 101) corresponding to the domain name of the IPv4 terminal 2 from the message L.

The DNS substituting means 13 forms a message (hereinafter, called a 'message P') to notify of an 'IPv4-mapped IPv6 address' (: : FFFF : 133. 144. 95. 101) in which the IPv4 address (133. 144. 95. 101) of the IPv4 terminal 2 has been set as an IP address corresponding to the domain name of the IPv4 terminal 2. The DNS substituting means 13 instructs the IP transmitting and receiving means 10 so as to transfer the message P to the IPv6 terminal 5 and sends the message P thereto. The IP transmitting and receiving means 10 transmits the message P to the IPv6 terminal 5 via the IPv6 network.

As shown in FIG. 9, the IPv6 terminal 5 transmits the IPv6 packet in which the IPv6 address (: : FFFF : 133. 144. 95. 101) notified from the IPv4-IPv6 converting apparatus 1a has been set into the IPv6 destination address field of the IPv6 packet and the own IPv6 address (1 : : 1) has been set into the IPv6 source address field to the IPv4-Ipv6 converting apparatus 1a through the IPv6 network.

The IP transmitting and receiving means 10 of the IPv4-IPv6 converting apparatus 1a sends the received IPv6 packet to the IP header converting means 11. The IP header converting means 11 extracts the IPv6 address (: : FFFF : 133. 144. 95. 101) from the Ipv6 destination address field of the IPv6 packet, converts the IPv6 address into the IPv4 address (133. 144. 95. 101) of 32 bits by deleting the fixed pattern of 96 bits mentioned above, and sets the IPv4 address into the IPv4 destination address field of the IPv4 packet. The IP header converting means 11 extracts the IPv6 address (1 : : 1) from the IPv6 source address field of the IPv6 packet and sends it to the IP address conversion information holding means 15.

The IP address conversion information holding means 15 retrieves the IP address conversion table 151 by using the IPv6 address (1 : : 1) of the IPv6 terminal 5 as a key and notifies the IP header converting means 11 of a result indicating whether the relevant entry has been registered or not.

The IP header converting means 11 which received the notification that the relevant entry is not registered yet in the IPv6 address (1 : : 1) of the IPv6 terminal 5 instructs the IPv4 address capturing means 14 so as to capture the IPv4 address and, after that, waits for a reply for a predetermined time. The IPv4 address capturing means 14 forms an IPv4 address capturing message (hereinafter, referred to as a "message M"), instructs the IP transmitting and receiving means 10 s as to transfer the message M to the DHCPv4 server 4, supplies the message M thereto, and after that, waits for a reply for a predetermined time. The IP transmitting and receiving means 10 transmits the message M to the DHCPv4 server 4 via the IPv4 network.

The DHCPv4 server 4 which received the message M gives the IPv4 address to the IPv6 address (1 : : 1) of the IPv6 terminals 5 (it is now assumed that 133. 144. 95. 1 was given) and returns an IPv4 address given message (hereinafter, referred to as a "message N").

The IP transmitting and receiving means 10 which received the message N transmits the message N to the IPv4 address capturing means 14. The IPv4 address capturing means 14 obtains the IPv4 address (133. 144. 95. 1) from the message N and notifies the IP header converting means 11. The IP header converting means 11 transmits the IPv4 address (133. 144. 95. 1) captured from the DHCPv4 server 4 to the IP address conversion information holding means 15 so as to correspond to the IPv6 address (1 : : 1) of the IPv6 terminal 5. The IP address conversion information holding means 15 forms a new entry into the IP address conversion table 151 and registers the correspondence between the IPv4 address (133. 144. 95. 1) and the IPv6 address (1 : : 1) of the IPv6 terminal 5. The entry of the IP address conversion table 151 is deleted when it is not referred to for a predetermined time. The IPv4 address (133. 144. 95. 1) is returned to the DHCPv4 server 4.

When a notification that the corresponding entry has been registered in the IPv6 address (1 : : 1) of the IPv6 terminal 5 is received or when the registration of the corresponding entry into the IPv6 address (1 : : 1) of the IPv6 terminal 5 is completed, the IP header converting means 11 sets the IPv4 address (133. 144. 95. 1) into the IPv4 source address field of the IPv4 packet. The IPv4 packet formed by performing the IP header conversion as mentioned above is sent to the IP transmitting and receiving means 10. The IP transmitting and receiving means 10 transmits the IPv4 packet to the IPv4 terminal 2 through the IPv4 network.

In this manner, the communication from the IPv6 terminal 5 to the IPv4 terminal 2 can be started.

Figure 12:
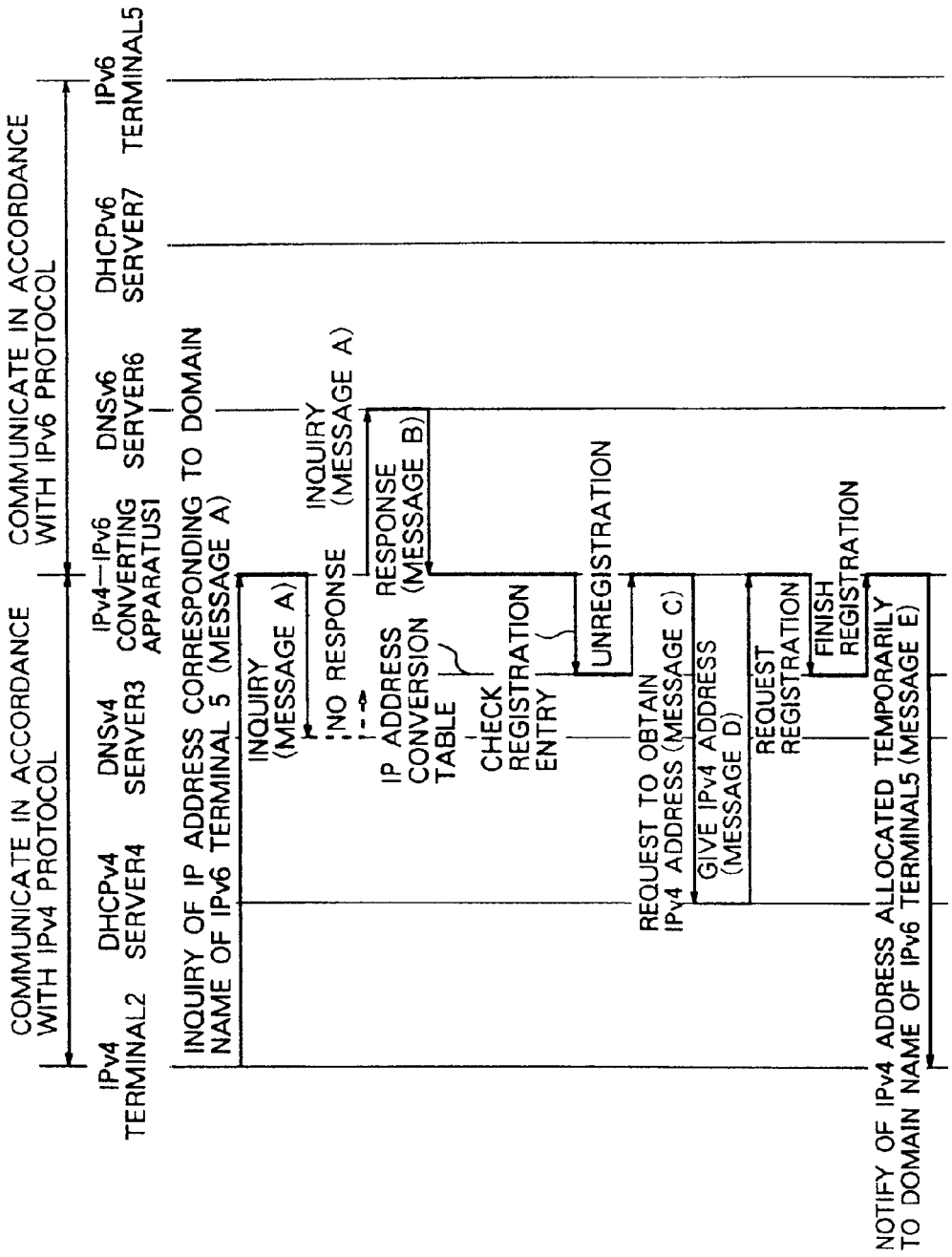
FIG. 12 is a flowchart in another case of starting a communication from the IPv4 terminal to the IPv6 terminal.
Figure 13:
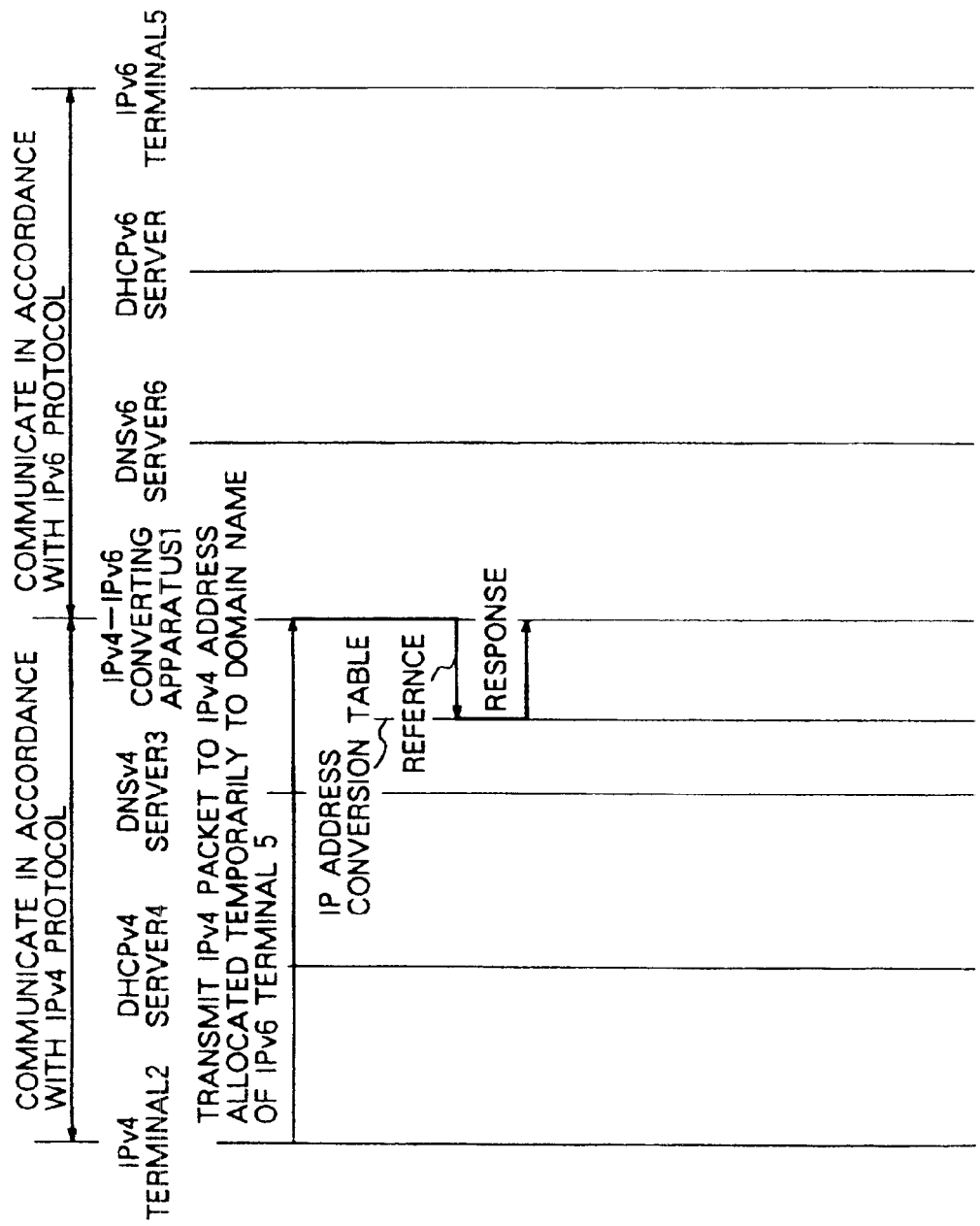
FIG. 13 is a flowchart which is continuous to FIG. 12.

FIGS. 12 and 13 are flowcharts for operation in another case of starting a communication from the IPv4 terminal 2 to the IPv6 terminal 5. This case has a feature in that "IPv4-mapped IPv6 address" is not used.

Although the IPv4 terminal 2 knows a domain name of the IPv6 terminal 5, it doesn't know an IP address. As shown in FIG. 12, therefore, after the IPv4 terminal 2 transmitted an inquiry message (hereinafter, called a 'message A') of the IP address corresponding to the domain name of the IPv6 terminal 5 to the IPv4-IPv6 converting apparatus 1a via the IPv4 network 104, it waits for a response for a predetermined time.

The IP transmitting and receiving means 10 of the IPv4-Ipv6 converting apparatus 1a receives and processes the message A and sends it to the DNS substituting means 13. The DNS substituting means 13 instructs the IP transmitting and receiving means 10 so as to transfer the message A to the DNSv4 server 3, sends the message A thereto, and after that, waits for a response for a predetermined time. The IP transmitting and receiving means 10 transfers the message A to the DNSv4 server 3 via the IPv4 network.

The DNSv4 server 3 which received the message A retrieves the domain information of the IPv6 terminal 5. When it is not registered, however, a response to the message A is not returned.

The DNS substituting means 13 which didn't receive the response from the DNSv4 server 3 even after the elapse of a predetermined time instructs the IP transmitting and receiving means 10 so as to transfer the message A to the DNSv6 server 6, sends the message A thereto, and after that, waits for a response for a predetermined time. The IP transmitting and receiving means 10 transfers the message A to the DNSv6 server 6 via the IPv6 network.

The DNSv6 server 6 which received the message A retrieves the domain information of the IPv6 terminal 5 and returns the registered domain information of the IPv6 terminal 5 to the IPv4-IPv6 converting apparatus 1a as a response message (hereinafter, referred to as a 'message B') for the message A.

The IP transmitting and receiving means 10 of the IPv4-IPv6 converting apparatus 1a which received the response from the DNSv6 server 6 within the predetermined time sends the received message B to the DNS substituting means 13. The DNS substituting means 13 obtains the IPv6 address (1 : : 1) corresponding to the domain name of the IPv6 terminal 5 from the message B and sends it to the IP address conversion information holding means 15. The IP address conversion information holding means 15 retrieves the IP address conversion table 151 by using the IPv6 address (1 : : 1) of the IPv6 terminal 5 as a key. If the relevant entry has been registered, the IPv4 address of the entry is returned to the DNS substituting means 13. On the other hand, when the relevant entry is not registered yet, such a fact is notified to the DNS substituting means 13.

The DNS substituting means 13 which received the IPv4 address from the Ip address conversion information holding means 15 forms a message (hereinafter, referred to as a message E') to notify of the IPv4 address as an IPv4 address corresponding to the domain name of the IPv6 terminal 5 and sends it to the IP transmitting and receiving means 10.

The IP transmitting and receiving means 10 transmits the message E to the IPv4 terminal 2 via the IPv4 network.

On the other hand, the DNS substituting means 13 which received the notification indicating that the entry is not registered yet from the IP address conversion information holding means 15 instructs the IPv4 address capturing means 14 so as to capture the IPv4 address and, after that, waits for a response for a predetermined time. The IPv4 address capturing means 14 forms an IPv4 address capturing message (hereinafter, called a 'message C') instructs the IP transmitting and receiving means 10 so as to transfer the message C to the DHCPv4 server 4, sends the message C thereto, and after that, waits for a response for a predetermined time. The IP transmitting and receiving means 10 transmits the message C to the DHCPv4 server 4 via the IPv4 network.

The DHCPv4 serve 4 which received the message C gives the IPv4 address to the IPv6 address (1 : : 1) of the IPv6 terminal 5 (it is now assumed that "133. 144. 95. 1" has been given) and returns an IPv4 address given message (hereinafter, called a 'message D').

The IP transmitting and receiving means 10 which received the message D sends the message D to the IPv4 address capturing means 14. The IPv4 address capturing means 14 obtains the IPv4 address (133. 144. 95. 1) from the message D and notifies the DNS substituting means 13. The DNS substituting means 13 forms the message E to notify of the IPv4 address (133. 144. 95. 1) as an IP address corresponding to the domain name of the IPv6 terminal 5 and sends it to the IP transmitting and receiving means 10. The IP transmitting and receiving means 10 transmits the message E to the IPv4 terminal 2 via the IPv4 network. The DNS substituting means 13 sends the IPv4 address (133. 144. 95. 1) captured from the DHCPv4 server 4 to the IP address conversion information holding means 15 in correspondence to the IPv6 address (1 : : 1) of the IPv6 terminal 5. The IP address conversion information holding means 15 forms a new entry into the IP address conversion table 151 and registers a correspondence of the IPv4 address (133. 144. 95. 1) and the IPv6 address (1 : : 1) of the IPv6 terminal 5. The entry of the IP address conversion table 151 is deleted in the case where it is not referred for a predetermined time. The IPv4 address (133. 144. 95. 1) is returned to the DHCPv4 server 4.

As shown in FIG. 13, the IPv4 terminal 2 transmits the IPv4 packet in which the IPv4 address (133. 144. 95. 1) notified from the IPv4-IPv6 converting apparatus 1a by the message E has been set into an IPv4 destination address field of the IPv4 packet and an own IPv4 address (133. 144. 95. 101) has been set into an IPv4 source address field to the IPv4-IPv6 converting apparatus 1a through the IPv4 network.

The IP transmitting and receiving means 10 of the IPv4-IPv6 converting apparatus 1a sends the received IPv4 packet to the IP header converting means 11. The IP header converting means 11 extracts the IPv4 address (133. 144. 95. 101) from the IPv4 source address field of the IPv4 packet, and sends it to the IP address conversion information holding means 15. The IP address conversion information holding means 15 retrieves the IP address conversion table 151 by using the IPv4 address (133. 144. 95. 101) of the IPv4 terminal 2 as a key. When the relevant entry has been registered, the IPv6 address of the entry is returned to the IP header converting means 11. On the other hand, if the relevant entry is not registered yet, such a fact is notified to the IP header converting means 11.

Figure 11:
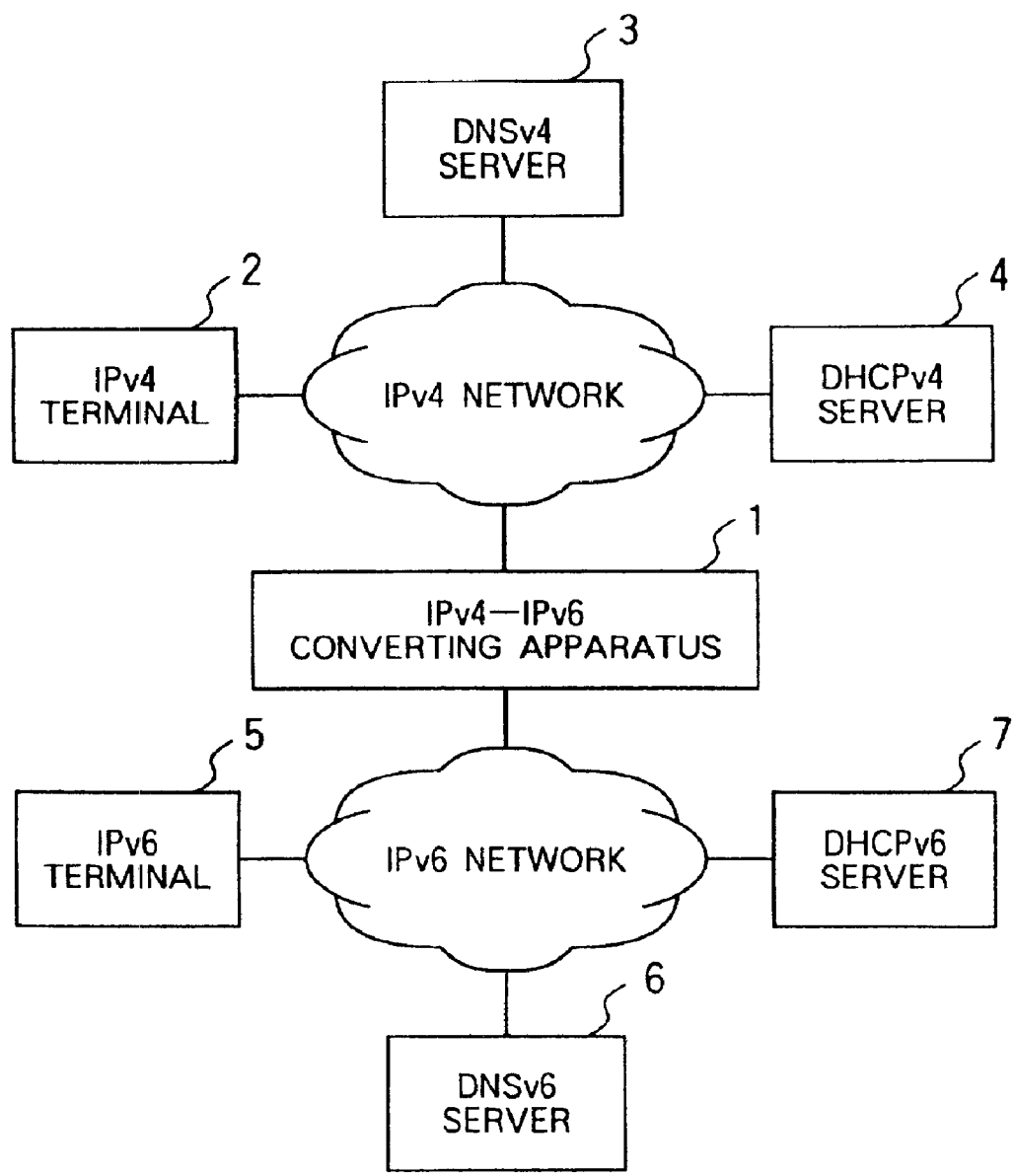
FIG. 11 is a constructional diagram of another network system.

The IP header converting means 11 which received the notification that the entry is not registered from the IP address conversion information holding means 15 instructs the IPv6 address capturing means 20 so as to capture the IPv6 address and, after that, waits for a reply for a predetermined time. The IPv6 address capturing means 20 forms an IPv6 address capturing message (hereinafter, referred to as a "message C6"), instructs the IP transmitting and receiving means 10 so as to transfer the message C6 to the DHCPv6 server 7 (FIG. 11), supplies the message C6 thereto, and after that, waits a replay for a predetermined time. The IP transmitting and receiving means 10 transmits the message C6 to the DHCPv6 server 7 via the IPv6 network.

The DHCPv6 server 7 which received the message C6 gives the IPv6 address to the IPv4 address (133. 144. 95. 101) of the IPv4 terminal 2 (it is now assumed that 1 : : 101 was given) and returns an IPv6 address given message (hereinafter, referred to as a "message D6").

Figure 10:
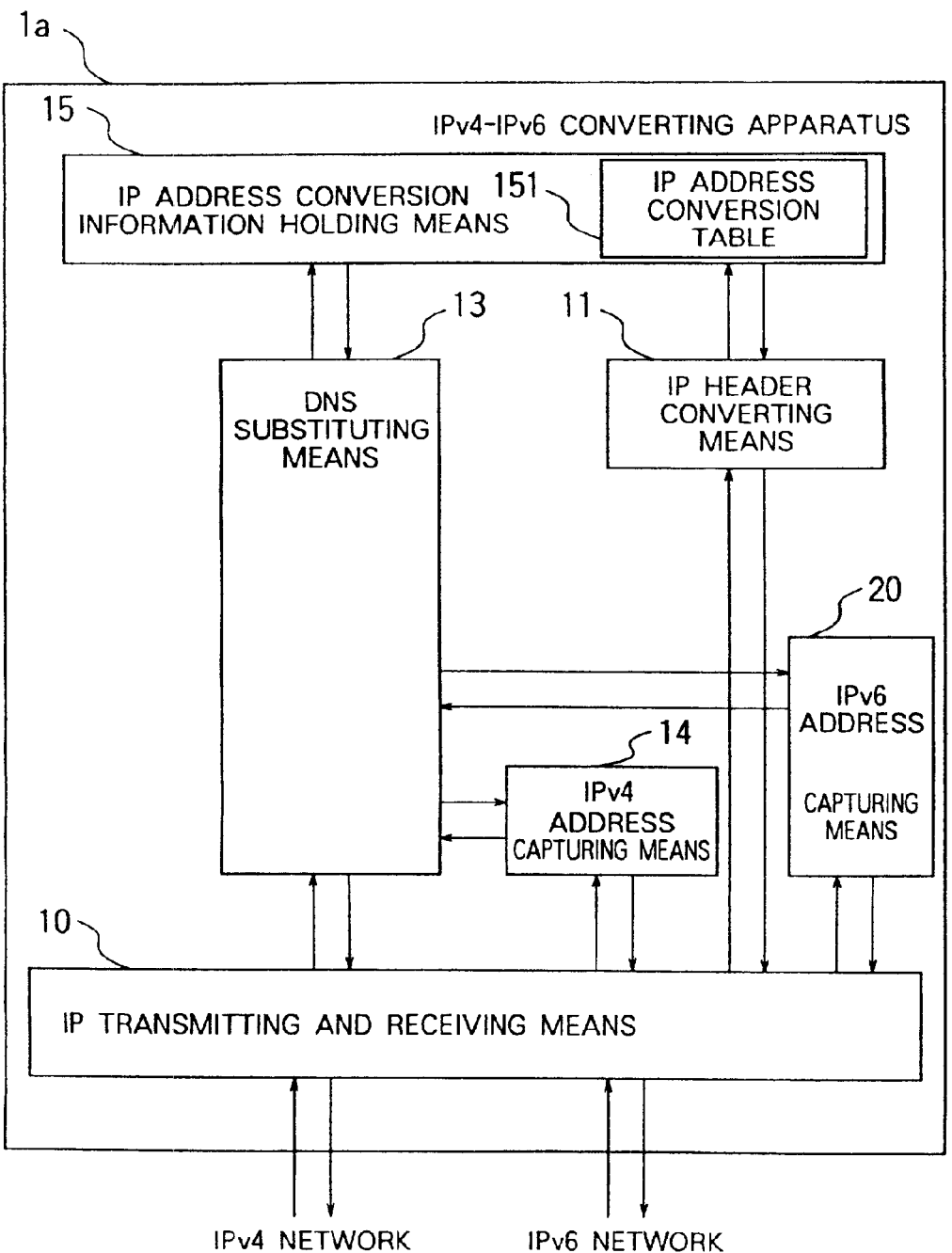
FIG. 10 is a constructional diagram of another IPv4-IPv6 converting apparatus.

The IP transmitting and receiving means 10 which received the message D6 supplies the message D6 to the IPv6 address capturing means 20 (FIG. 10). The IPv6 address capturing means 20 obtains an IPv6 address (1 : : 101) from the message D6 and notifies the IP header converting means 11.

The IP header converting means 11 transmits the IPv6 address (1 : : 101) captured from the DHCPv6 server 7 to the IP address conversion information holding means 15 so as to correspond to the IPv4 address (133. 144. 95. 101) of the IPv4 terminal 2. The IP address conversion information holding means 15 forms a new entry into the IP address conversion table 151 and registers a correspondence between the IPv6 address (1 : : 101) and the IPv4 address (133. 144. 95. 101) of the IPv4 terminal 2. The entry in the IP address conversion table 151 is deleted when it is not referred to for a predetermined time. The IPv6 address (1 : : 101) is returned to the DHCPv6 server 7.

When a notification that the relevant entry has been registered in the IPv4 address (133. 144. 95. 101) of the IPv4 terminal 2 is received or when the registration of the relevant entry into the IPv4 address (133. 144. 95. 101) of the IPv4 terminal 2 is completed, the IPv6 address (1 : : 101) of the relevant entry is set into an IPv6 transmission address field of the IPv6 packet. The IP header converting means 11 extracts the IPv4 address (133. 144. 95. 1) from the IPv4 destination address field of the IPv4 packet and sends it to the IP address conversion information holding means 15. The IP address conversion information holding means 15 obtains the IPv6 address (1 : : 1) corresponding to the IPv4 address (133. 144. 95. 1) with reference to the IP address conversion table 151 and sends it to the IP header converting means 11. The IP header converting means 11 sets the IPv6 address (1 : : 1) into an IPv6 destination address field of the IPv6 packet. The IPv6 packet formed by performing the IP header conversion as mentioned above is sent to the IP transmitting and receiving means 10. The IP transmitting and receiving means 10 transmits the IPv6 packet to the IPv6 terminal 5 through the IPv6 network.

In this manner, the communication from the IPv4 terminal 2 to he IPv6 terminal 5 can be started.

Figure 14:
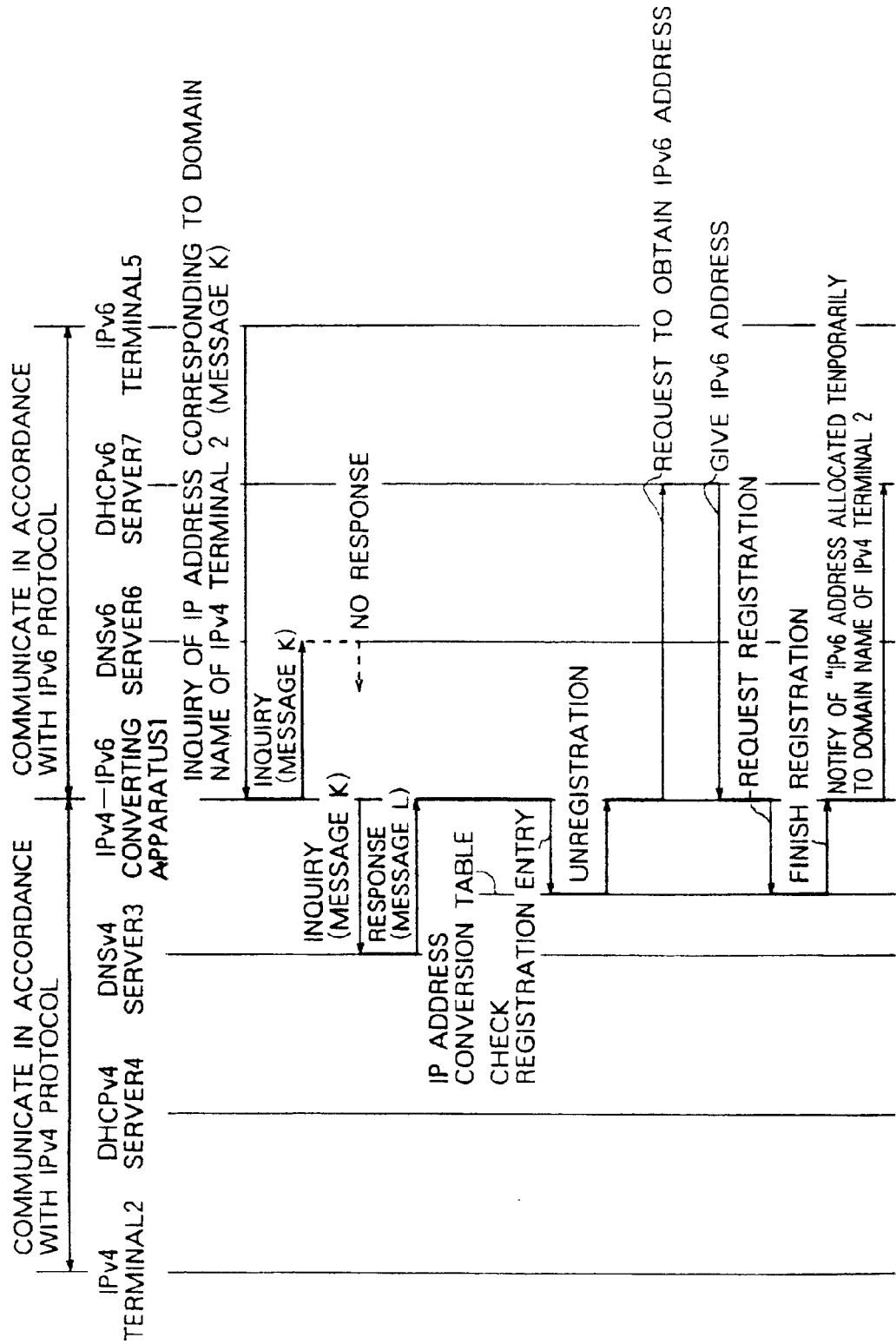
FIG. 14 is a flowchart in still another case of starting a communication from the IPv6 terminal to the IPv4 terminal.
Figure 15:
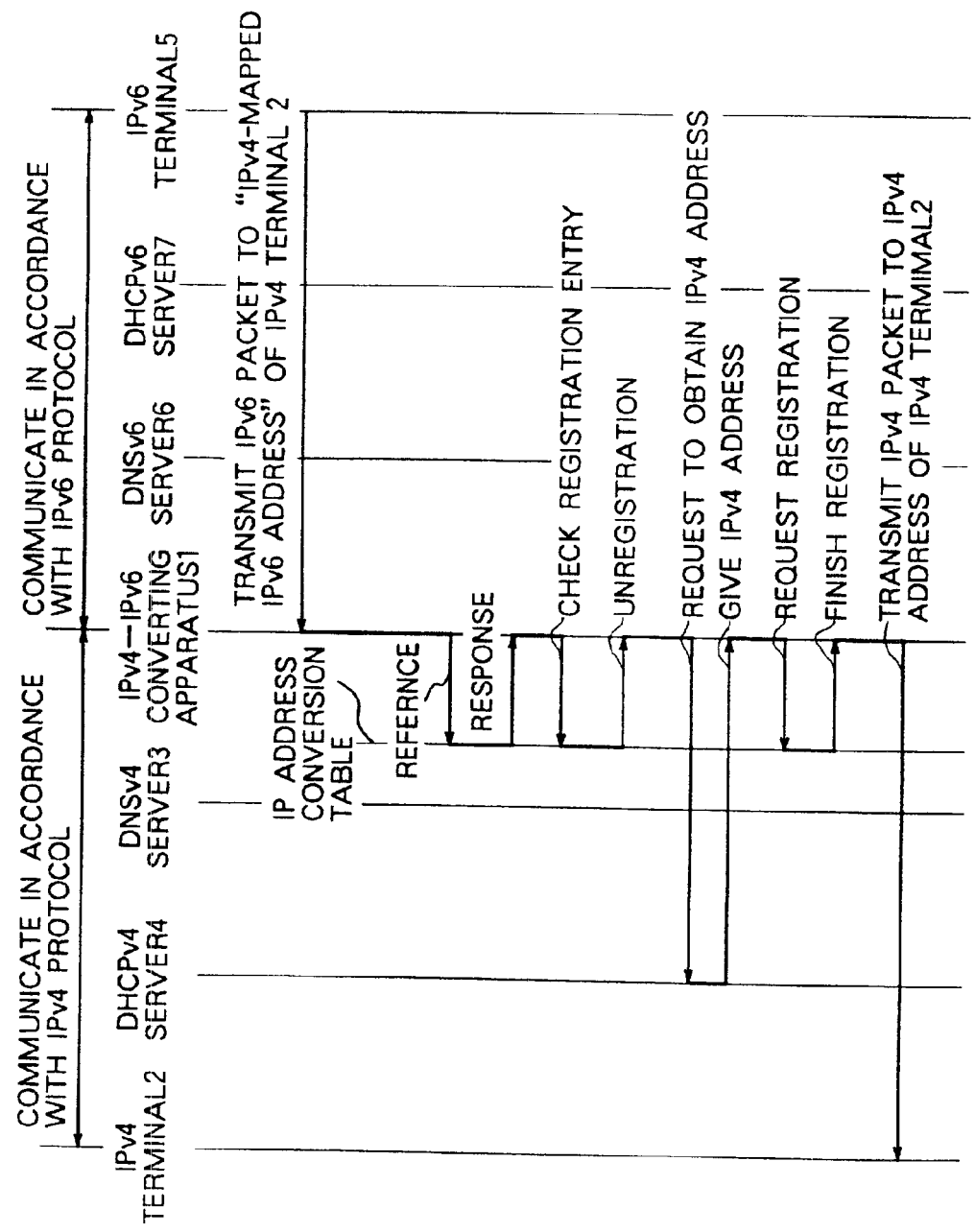
FIG. 15 is a flowchart which is continuous to FIG. 14.

FIGS. 14 and 15 are flowcharts for operation in another case of starting a communication from the IPv6 terminal 5 to the IPv4 terminal 2. This case has the feature in that the "IPv4-mapped IPv6 address" is not used.

Although the IPv6 terminal 5 knows a domain name of the IPv4 terminal 2, it doesn't know the IP address. As shown in FIG. 14, therefore, the IPv6 terminal 5 transmits an inquiry message (hereinafter, called a 'message K') of an IP address corresponding to the domain name of the IPv4 terminal 2 to the IPv4-IPv6 converting apparatus 1a via the IPv6 network 106 and, after that, waits for a response for a predetermined time.

The IP transmitting and receiving means 10 of the IPv4-IPv6 converting apparatus 1a receives and processes the message K and sends it to the DNS substituting means 13. The DNS substituting means 13 instructs the IP transmitting and receiving means 10 so as to transfer the message K to the DNSv6 server 6, sends the message K thereto, and after that, waits for a response for a predetermined time. The IP transmitting and receiving means 10 transfers the message K to the DNSv6 server 6 via the IPv6 network.

The DNSv6 server 6 which received the message K retrieves the domain information of the IPv4 terminal 2. However, when it is not registered, a response to the message K is not returned.

The DNS substituting means 13 which didn't receive the response from the DNSv6 server 6 even after the elapse of a predetermined time instructs the IP transmitting and receiving means 10 so as to transfer the message K to the DNSv4 server 3, sends the message K thereto, and after that, waits for a response for a predetermined time. The IP transmitting and receiving means 10 transfers the message K to the DNSv4 server 3 via the IPv4 network.

The DNSv4 server 3 which received the message K retrieves the domain information of the IPv4 terminal 2 and returns the registered domain information of the IPv4 terminal 2 to the IPv4-IPv6 converting apparatus 1a as a response message (hereinafter, called a 'message L') for the message K.

The IP transmitting and receiving means 10 of the IPv4-IPv6 converting apparatus 1a which received the response from the DNSv4 server 3 within the predetermined time sends the received message L to the DNS substituting means 13. The DNS substituting means 13 obtains the IPv4 address (133. 144. 95. 101) corresponding to the domain name of the IPv4 terminal 2 from the message L.

Subsequently, the DNS substituting means 13 sends the IPv4 address (133. 144. 95. 101) of the IPv4 terminal 2 to the IP address conversion information holding means 15. The IP address conversion information holding means 15 retrieves the IP address conversion table 151 by using the IPv4 address (133. 144. 95. 101) of the IPv4 terminal 2 as a key and notifies the DNS substituting means 13 of information about whether the relevant entry has been registered or not.

The DNS substituting means 13 which received a notification indicating that the relevant entry is not registered yet in the IPv4 address (133. 144. 95. 101) of the IPv4 terminal 2 instructs the IPv6 address capturing means 20 so as to capture the IPv6 address and, after that, waits for a response for a predetermined time. The IPv6 address capturing means 20 forms an IPv6 address capture message (hereinafter, called a 'message M6'), instructs the IP transmitting and receiving means 10 so as to transfer the message M to the DHCPv6 server 7, sends the message M thereto, and after that, waits for a response for a predetermined time. The IP transmitting and receiving means 10 transmits the message M6 to the DHCPv6 server 7 via the IPv6 network.

The DHCPv6 server 7 which received the message M6 gives the IPv6 address to the IPv4 address (133. 144. 95. 101) of the IPv4 terminal 2 (it is now assumed that "1 : : 101" is given) and returns an IPv6 address given message (hereinafter, called a 'message N6').

The IP transmitting and receiving means 10 which received the message N6 sends the message N6 to the IPv6 address capturing means 20. The IPv6 address capturing means 20 obtains the IPv6 address (1 : : 101) from the message N6 and notifies the DNS substituting means 13. The DNS substituting means 13 sends the IPv6 address (1 : 101) captured from the DHCPv6 server 7 to the IP address conversion information holding means 15 in correspondence to the IPv4 address (133. 144. 95. 101) of the IPv4 terminal 2. The IP address conversion information holding means 15 forms a new entry into the IP address conversion table 151 and registers a correspondence of the IPv6 address (1 : : 101) and the IPv4 address (133. 144. 95. 101) of the IPv4 terminal 2. The entry in the IP address conversion table 151 is deleted when it is not referred to for a predetermined time and the IPv6 address (1 : : 101) is returned to the DHCPv6 server 7.

When a notification indicating that the relevant entry has been registered in the IPv4 address (133. 144. 95. 101) of the IPv4 terminal 2 is received or when the registration of the relevant entry into the IPv4 address (133. 144. 95. 101) of the IPv4 terminal 2 is completed, the DNS substituting means 13 forms a message (hereinafter, called a 'message P') to notify of the IPv6 address (1 : : 101) corresponding to the IPv4 address (133. 144. 95. 101) of the IPv4 terminal 2 as an IP address corresponding to the domain name of the IPv4 terminal 2. The DNS substituting means 13 instructs the IP transmitting and receiving means 10 so as to transfer the message P to the IPv6 terminal 5 and sends the message P thereto. The IP transmitting and receiving means 10 transmits the message P to the IPv6 terminal 5 via the IPv6 network.

As shown in FIG. 15, the IPv6 terminal 5 transmits the IPv6 packet in which the IPv6 address (1 : : 101) notified from the IPv4-IPv6 converting apparatus 1a has been set into the IPv6 destination address field of the IPv6 packet and the own IPv6 address (1 : : 1) has been set into the IPv6 source address field to the IPv4-IPv6 converting apparatus 1a through the IPv6 network.

The IP transmitting and receiving means 10 of the IPv4-IPv6 converting apparatus 1a sends the received IPv6 packet to the IP header converting means 11. The IP header converting means 11 extracts the IPv6 address (1 : : 101) from the IPv6 destination address field of the Ipv6 packet, and supplies it to the IP address conversion information holding means 15. The IP address conversion information holding means 15 obtains the IPv4 address (133. 144. 95. 101) corresponding to the IPv6 address (1 : : 101) with reference to the IP address conversion table 151 and transmits to the IP header converting means 11. The IP header converting means 11 sets the IPv4 address (133. 144. 95. 101) into the IPv4 destination address field of the IPv4 packet. The IP header converting means 11 extracts the IPv6 address (1 : : 1) from the IPv6 source address field of the IPv6 packet and sends it to the IP address conversion information holding means 15.

The IP address conversion information holding means 15 retrieves the IP address conversion table 151 by using the IPv6 address (1 : : 1) of the IPv6 terminal 5 as a key and notifies the IP header converting means 11 of a result indicating whether the relevant entry has been registered or not.

The IP header converting means 11 which received the notification that the relevant entry is not registered yet in the IPv6 address (1 : : 1) of the IPv6 terminal 5 instructs the IPv4 address capturing means 14 so as to capture the Ipv4 address and, after that, waits for a reply for a predetermined time. The IPv4 address capturing means 14 forms an IPv4 address capturing message (hereinafter, referred to as a "message M"), instructs the IP transmitting and receiving means 10 so as to transfer the message M to the DHCPv4 server 4, supplies the message M thereto, and after that, waits for a reply for a predetermined time. The IP transmitting and receiving means 10 transmits the message M to the DHCPv4 server 4 via the IPv4 network.

The DHCPv4 server 4 which received the message M gives the IPv4 address to the IPv6 address (1 : : 1) of the IPv6 terminal 5 (it is now assumed that 133. 144. 95. 1 was given) and returns an IPv4 address given message (hereinafter, referred to as a "message N").

The IP transmitting and receiving means 10 which received the message N transmits the message N to the IPv4 address capturing means 14. The IPv4 address capturing means 14 obtains the IPv4 address (133. 144. 95. 1) from the message N and notifies the IP header converting means 11. The IP header converting means 11 transmits the IPv4 address (133. 144. 95. 1) captured from the DHCPv4 server 4 to the IP address conversion information holding means 15 so as to correspond to the IPv6 address (1 : : 1) of the IPv6 terminal 5. The IP address conversion information holding means 15 forms a new entry into the IP address conversion table 151 and registers the correspondence between the IPv4 address (133. 144. 95. 1) and the IPv6 address (1 : : 1) of the IPv6 terminal 5. The entry of the IP address conversion table 151 is deleted when it is not referred to for a predetermined time. The IPv4 address (133. 144. 95. 1) is returned to the DHCPv4 server 4.

When a notification that the corresponding entry has been registered in the IPv6 address (1 : : 1) of the IPv6 terminal 5 is received or when the registration of the corresponding entry into the IPv6 address (1 : : 1) of the IPv6 terminal 5 is completed, the IP header converting means 11 sets the IPv4 address (133. 144. 95. 1) into the IPv4 source address field of the IPv4 packet. The IPv4 packet formed by performing the IP header conversion as mentioned above is sent to the IP transmitting and receiving means 10. The IP transmitting and receiving means 10 transmits the IPv4 packet to the IPv4 terminal 2 through the Ipv4 network.

In this manner, the communication from the IPv6 terminal 5 to the IPv4 terminal 2 can be started.

(B) Second Embodiment

Figure 16:
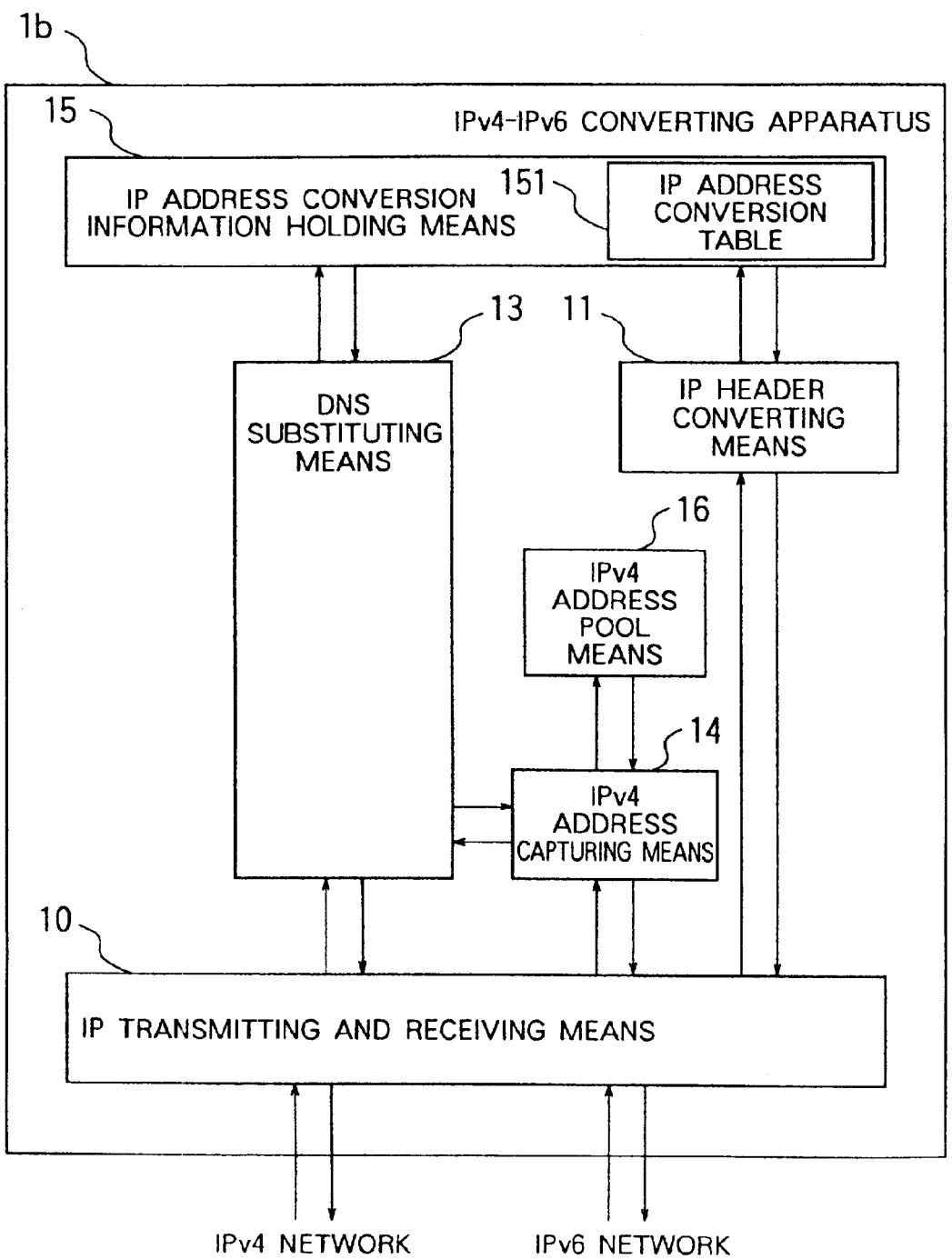
FIG. 16 is a constructional diagram of an IPv4-IPv6 converting apparatus according to the second embodiment of the invention.

FIG. 16 is a constructional diagram of an IPv4-IPv6 converting apparatus 1b according to the second embodiment of the invention.

The IPv4-IPv6 converting apparatus 1b has a construction obtained by adding IPv4 address pool means 16 to the IPv4-IPv6 converting apparatus 1a of FIG. 1.

At the time of an activation or the like of the IPv4-IPv6 converting apparatus 1b, the IPv4 address capturing means 14 captures a plurality of IPv4 addresses in a lump from the DHCPv4 server 4 and pools them into the IPv4 address pool means 16. At the start of the communication between the IPv4 terminal 2 and IPv6 terminal 5, the IPv4 address capturing means 14 obtains the IPv4 addresses from the IPv4 address pool means 16.

By using the IPv4-IPv6 converting apparatus 1b, a load of the IPv4 network 104 can be reduced more than the case of capturing the IPv4 addresses one by one from the DHCPv4 server 4.

(C) Third Embodiment

Figure 17:
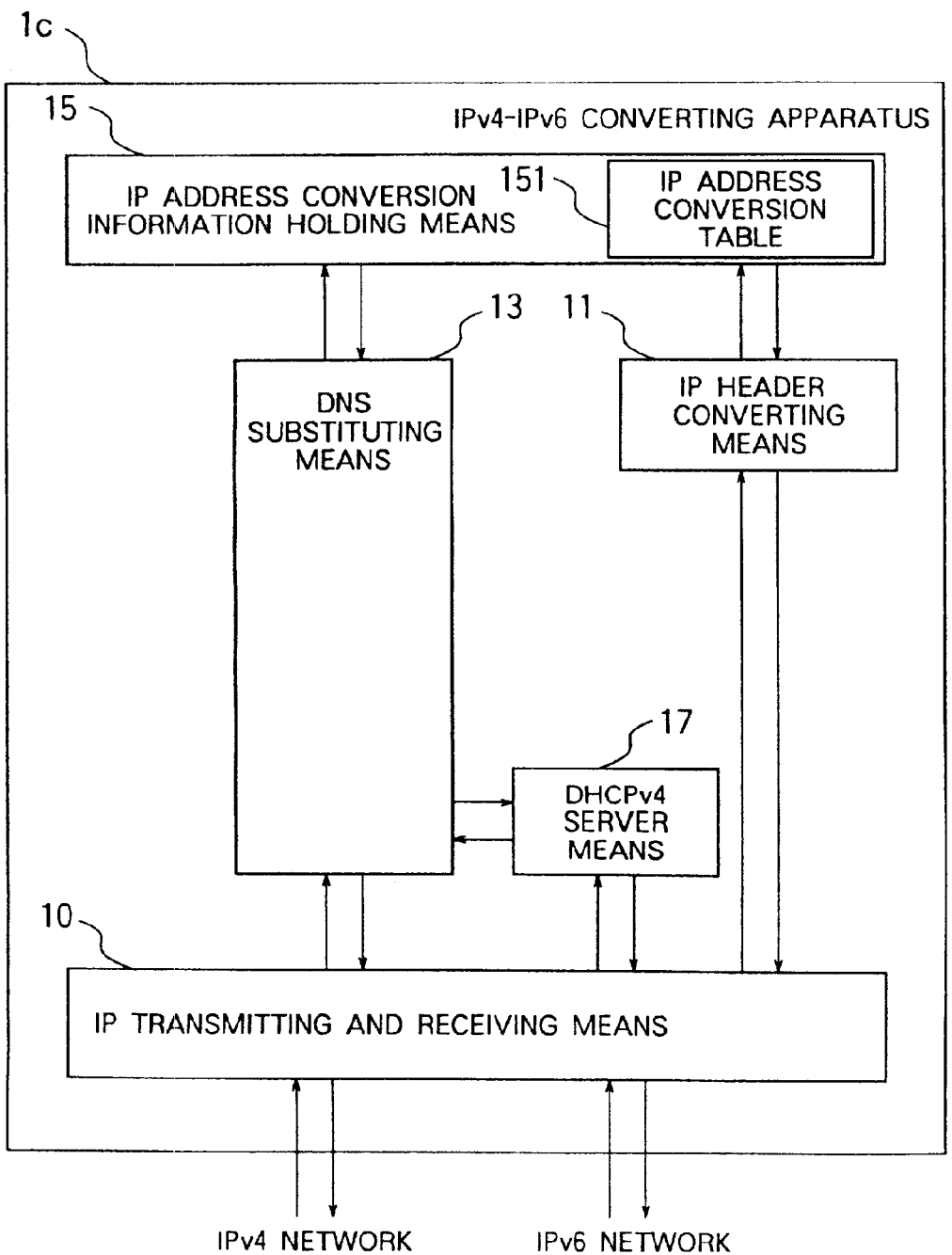
FIG. 17 is a constructional diagram of an IPv4-IPv6 converting apparatus according to the third embodiment of the invention.

FIG. 17 is a constructional diagram of an IPv4-IPv6 converting apparatus 1c according to the third embodiment of the invention.

The IPv4-IPv6 converting apparatus 1c has a construction obtained by providing DHCPv4 server means 17 in place of the IPv4 address capturing means 14 of the IPv4-IPv6 converting apparatus 1a of FIG. 1.

By using the IPv4-IPv6 converting apparatus 1c, there is no need to individually provide the DHCPv4 server 4.

(D) Fourth Embodiment

Figure 18:
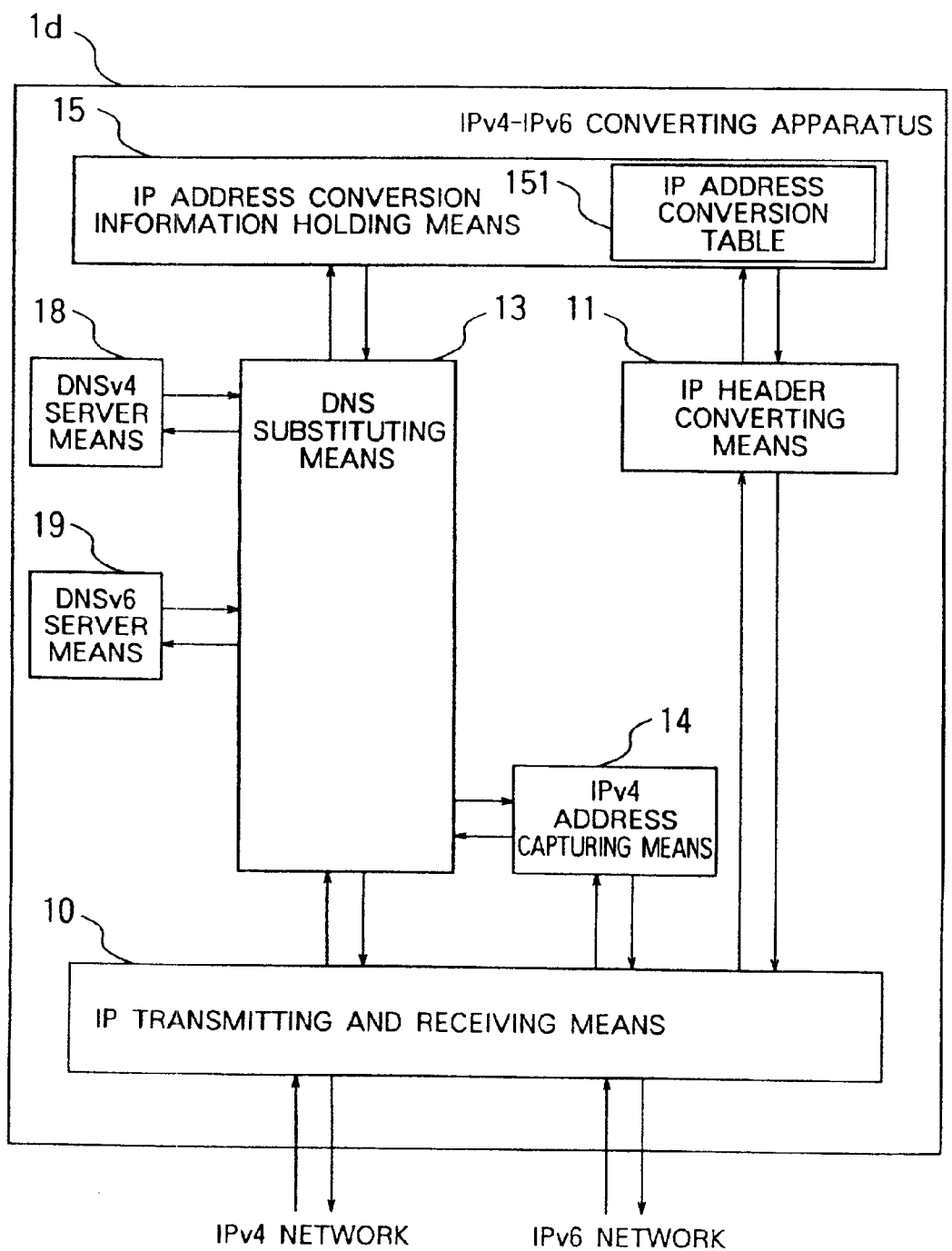
FIG. 18 is a constructional diagram of an IPv4-IPv6 converting apparatus according to the fourth embodiment of the invention.

FIG. 18 is a constructional diagram of an IPv4-IPv6 converting apparatus 1d according to the fourth embodiment of the invention.

The IPv4-IPv6 converting apparatus 1d has a construction obtained by adding DNSv4 server means 18 and DNSv6 server means 19 to the IPv4-IPv6 converting apparatus 1a of FIG. 1.

By using the IPv4-IPv6 converting apparatus 1d, there is no need to individually provide the DNSv4 server 3 and DNSv6 server 6.

(E) Fifth Embodiment

The fifth embodiment will now be described by using FIGS. 19, 20, and 21.

Figure 19:
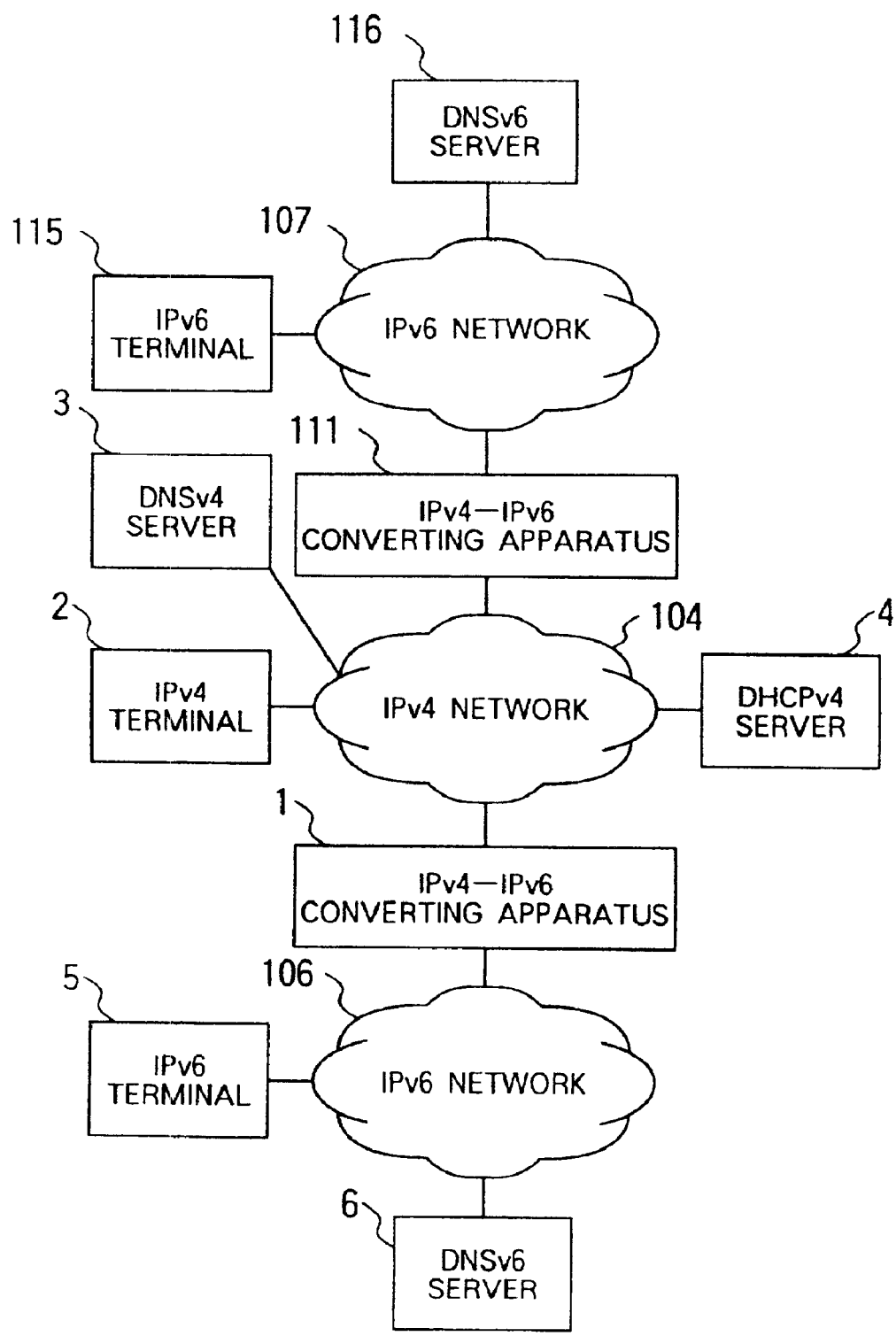
FIG. 19 is a constructional diagram of a communication network system according to the fifth embodiment of the invention.

FIG. 19 is a diagram of a communication network system 108 in which the IPv6 network 106 and an IPv6 network 107 are connected through the IPv4 network 104. The communication network system 108 has a construction obtained by adding the IPv6 network 107 to the communication network system 100 of FIG. 3. The IPv6 network 107 is connected to the IPv4 network 104 by an IPv4-IPv6 converting apparatus 111.

In addition to an IPv6 terminal 115, a DNSv6 server 116 for managing domain information in the IPv6 network 107 is connected to the IPv6 network 107.

It is now assumed that (2 : : 1) has been allocated as an IPv6 address to the IPv6 terminal 115. In addition to 100 IPv4 addresses of "133. 144. 95. 1" to "133. 144. 95. 100", 100 IPv4 addresses of "133. 144. 96. 1" to "133. 144. 96. 100" have been pooled in the DHCPv4 server 4. It is also assumed that the IPv4-IPv6 converting apparatus 111 has been set as a DNS server in the IPv6 terminal 115. It is assumed that the DNSv6 server 116 has been set as a DNS server and the DHCPv4 server 4 has been set as a DHCP server into the IPv4-IPv6 converting apparatus 111. It is also assumed that the IPv4-IPv6 converting apparatus 111 has been set as a DNS server of an upper domain into an IPv4-IPv6 converting apparatus 1.

Figure 20:
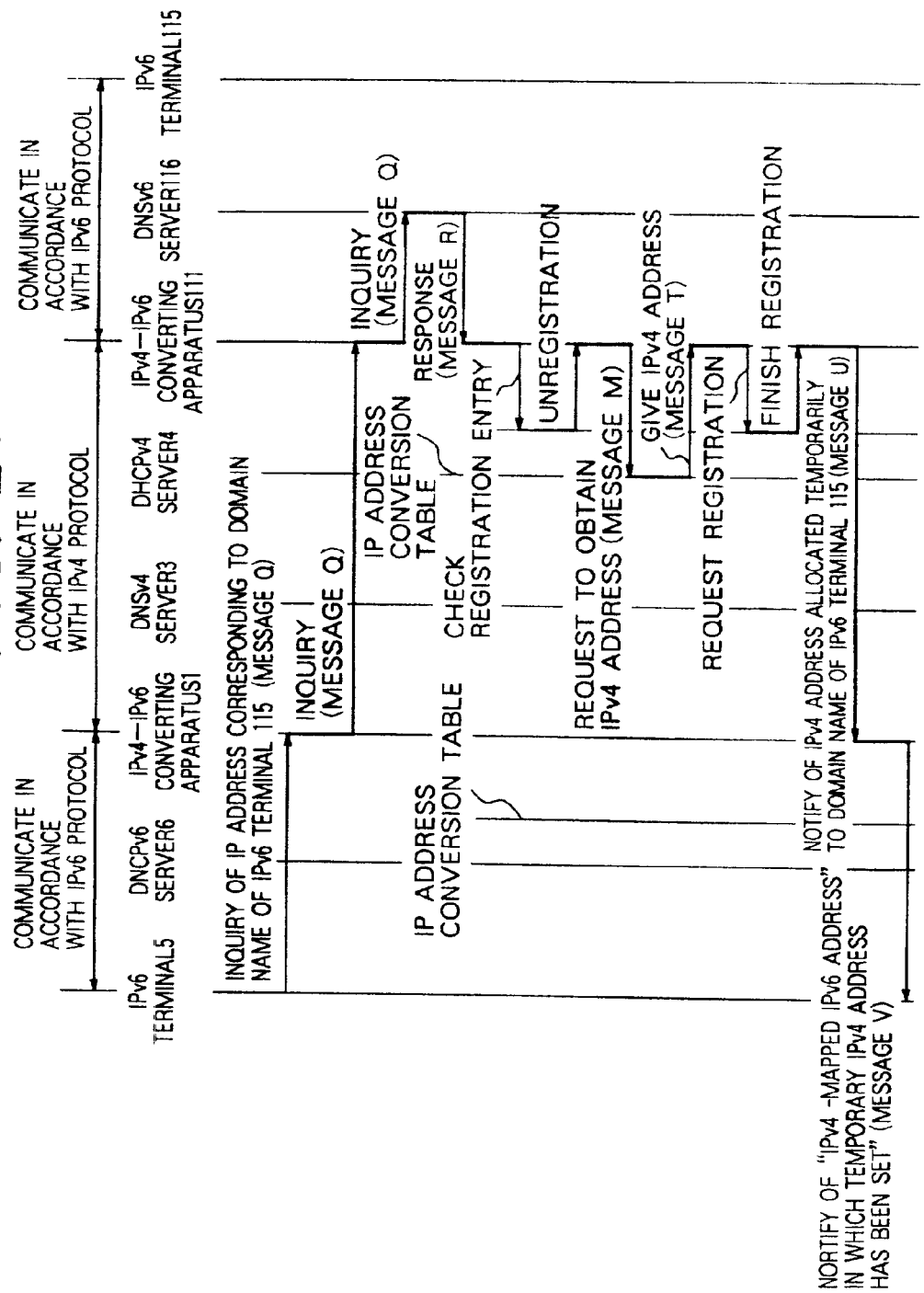
FIG. 20 is a flowchart in case of communicating between the IPv6 terminals through the IPv4-IPv6 converting apparatus according to the fifth embodiment of the invention.

FIGS. 20 and 21 are flowcharts for the operation in case of starting a communication from the IPv6 terminal 5 to the IPv6 terminal 115.

Although the IPv6 terminal 5 knows a domain name of the IPv6 terminal 115, it doesn't know an IP address. Therefore, as shown in FIG. 20, the IPv6 terminal 5 transmits an inquiry message (hereinafter, called a 'message Q') of the IP address corresponding to the domain name of the IPv6 terminal 115 to the IPv4-IPv6 converting apparatus 1 via the IPv6 network 106 and, after that, waits for a response for a predetermined time.

The IP transmitting and receiving means 10 of the IPv4-IPv6 converting apparatus 1 receives and processes the message Q and sends it to the DNS substituting means 13. The DNS substituting means 13 instructs the IP transmitting and receiving means 10 so as to transfer the message Q to the IPv4-IPv6 converting apparatus 111, sends the message Q thereto, and after that, waits for a response for a predetermined time. The IP transmitting and receiving means 10 transfers the message Q to the IPv4-IPv6 converting apparatus 111 via the IPv4 network.

The IP transmitting and receiving means 10 of the IPv4-IPv6 converting apparatus 111 receives and processes the message Q and sends it to the DNS substituting means 13. The DNS substituting means 13 instructs the IP transmitting and receiving means 10 so as to transfer the message Q to the DNSv6 server 116, sends the message Q thereto, and after that, waits for a response for a predetermined time. The IP transmitting and receiving means 10 transfers the message Q to the DNSv6 server 116 via the IPv6 network.

The DNSv6 server 116 which received the message Q retrieves domain information of the IPv6 terminal 115 and returns the registered domain information of the IPv6 terminal 115 to the IPv4-IPv6 converting apparatus 111 as a response message (hereinafter, called a 'message R') for the message Q.

The IP transmitting and receiving means 10 of the IPv4-IPv6 converting apparatus 111 which received the response from the DNSv6 server 116 within a predetermined time sends the received message R to the DNS substituting means 13. The DNS substituting means 13 obtains an IPv6 address (2 : : 1) corresponding to the domain name of the IPv6 terminal 115 from the message R and sends it to the IP address conversion information holding means 15. The IP address conversion information holding means 15 retrieves the IP address conversion table 151 by using the IPv6 address (2 : : 1) of the IPv6 terminal 115 as a key. If the relevant entry has been registered, the holding means 15 returns the IPv4 address of the entry to the DNS substituting means 13. On the other hand, if the relevant entry is not registered yet, such a fact is notified to the DNS substituting means 13.

The DNS substituting means 13 which received the IPv4 address from the IP address conversion information holding means 15 forms a message (hereinafter, called a 'message U') to notify of the IPv4 address as an IPv4 address corresponding to the domain name of the IPv6 terminal 115 and sends the message U to the IP transmitting and receiving means 10. The IP transmitting and receiving means 10 transmits the message U to the IPv4-IPv6 converting apparatus 1 via the IPv4 network.

The DNS substituting means 13 which received the notification that the entry is not registered yet from the IP address conversion information holding means 15 instructs the IPv4 address capturing means 14 so as to capture the IPv4 address and, after that, waits for a response for a predetermined time. The IPv4 address capturing means 14 forms an IPv4 address capturing message (hereinafter, called a 'message S'), instructs the IP transmitting and receiving means 10 so as to transfer the message S to the DHCPv4 server 4, sends the message S thereto, and after that, waits for a response for a predetermined time. The IP transmitting and receiving means 10 transmits the message S to the DHCPv4 server 4 via the IPv4 network.

The DHCPv4 server 4 which received the message S gives the IPv4 address to the IPv6 address (2 : : 1) of the IPv6 terminal 115 (it is now assumed that "133. 144. 96. 1" is given) and returns an IPv4 address given message (hereinafter, called a 'message T').

The IP transmitting and receiving means 10 which received the message T sends the message T to the IPv4 address capturing means 14. The IPv4 address capturing means 14 obtains the IPv4 address (133. 144. 96. 1) from the message T and notifies the DNS substituting means 13. The DNS substituting means 13 forms the message U to notify of the IPv4 address (133. 144. 96. 1) as an IP address corresponding to the domain name of the IPv6 terminal 115 and sends it to the IP transmitting and receiving means 10. The IP transmitting and receiving means 10 transmits the message U to the IPv4-IPv6 converting apparatus 1 via the IPv4 network. The DNS substituting means 13 sends the IPv4 address (133. 144. 96. 1) captured from the DHCPv4 server 4 to the IP address conversion information holding means 15 in correspondence to the IPv6 address (2 : : 1) of the IPv6 terminal 115. The IP address conversion information holding means 15 forms a new entry into the IP address conversion table 151 and registers a correspondence of the IPv4 address (133. 144. 96. 1) and the IPv6 address (2 : : 1) of the IPv6 terminal 115. The entry in the IP address conversion table 151 is deleted when it is not referred to for a predetermined time. The IPv4 address (133. 144. 96. 1) is returned to the DHCPv4 server 4.

The IP transmitting and receiving means 10 of the IPv4-IPv6 converting apparatus 1 which received the response from the IPv4-IPv6 converting apparatus 111 within the predetermined time sends the received message U to the DNS substituting means 13. The DNS substituting means 13 obtains the IPv4 address (133. 144. 96. 1) corresponding to the domain name of the IPv6 terminal 115 from the message U. The DNS substituting means 13 forms a message (hereinafter, called a 'message V') to notify of an 'IPv4-mapped IPv6 address' (: : FFFF : 133. 144. 96. 1) in which the IPv4 address (133. 144. 96. 1) derived from the message U has been set as an IP address corresponding to the domain name of the IPv6 terminal 115, instructs the IP transmitting and receiving means 10 so as to transfer the message V to the IPv6 terminal 5, and sends the message V thereto. The IP transmitting and receiving means 10 transmits the message V to the IPv6 terminal 5 via the IPv6 network.

As shown in FIG. 21, the IPv6 terminal 5 transmits the IPv6 packet in which the IPv6 address (: : FFFF : 133. 144. 96. 1) notified from the Ipv4-Ipv6 converting apparatus 1 has been set into the IPv6 destination address field of the IPv6 packet and the own IPv6 address (1 : : 1) has been set into the IPv6 source address field to the IPv4-IPv6 converting apparatus 1 through the IPv6 network.

The IP transmitting and receiving means 10 of the IPv4-IPv6 converting apparatus 1 sends the received IPv6 packet to the IP header converting means 11. The IP header converting means 11 extracts the IPv6 address (: : FFFF : 133. 144. 96. 1) from the IPv6 destination address field of the IPv6 packet, converts the IPv6 address to the IPv4 address (133. 144. 96. 1) of 32 bits by deleting the fixed pattern of 96 bits mentioned above, and sets the IPv4 address into the IPv4 destination address field of the IPv4 packet. The IP header converting means 11 extracts the IPv6 address (1 : : 1) from the IPv6 source address field of the IPv6 packet and sends it to the IP address conversion information holding means 15.

The IP address conversion information holding means 15 retrieves the IP address conversion table 151 by using the IPv6 address (1 : : 1) of the IPv6 terminal 5 as a key and notifies the IP header converting means 11 of a message indicating whether the relevant entry has been registered or not.

The IP header converting means 11 which received the notification that the relevant entry is not registered yet in the IPv6 address (1 : : 1) of the IPv6 terminal 5 instructs the IPv4 address capturing means 14 so as to capture the IPv4 address and, after that, waits for a response for a predetermined time. The IPv4 address capturing means 14 forms an IPv4 address capturing message (hereinafter, called a 'message W'), instructs the IP transmitting and receiving means 10 so as to transfer the message W to the DHCPv4 server 4, sends the message W thereto, and after that, waits for a response for a predetermined time. The IP transmitting and receiving means 10 transmits the message W to the DHCPv4 server 4 via the IPv4 network.

The DHCPv4 server 4 which received the message W gives the IPv4 address to the IPv6 address (1 : : 1) of the IPv6 terminal 5 (it is now assumed that "133. 144. 95. 1" is given) and returns an IPv4 address given message (hereinafter, called a 'message X').

The IP transmitting and receiving means 10 which received the message X sends the message X to the IPv4 address capturing means 14. The IPv4 address capturing means 14 obtains the IPv4 address (133. 144. 95. 1) from the message X and notifies the IP header converting means 11. The IP header converting means 11 sends the IPv4 address (133. 144. 95. 1) captured from the DHCPv4 server 4 to the IP address conversion information holding means 15 in correspondence to the IPv6 address (1 : : 1) of the IPv6 terminal 5. The IP address conversion information holding means 15 forms a new entry into the IP address conversion table 151 and registers a correspondence of the IPv4 address (133. 144. 95. 1) and the IPv6 address (1 : : 1) of the IPv6 terminal 5. The entry in the IP address conversion table 151 is deleted when it is not referred to for a predetermined time. The IPv4 address (133. 144. 95. 1) is returned to the DHCPv4 server 4.

When a notification that the relevant entry has been registered in the Ipv6 address (1 : : 1) of the IPv6 terminal 5 is received or when the registration of the relevant entry into the IPv6 address (1 : : 1) of the IPv6 terminal 5 is completed, the IP header converting means 11 sets the IPv4 address (133. 144. 95. 1) into the IPv4 source address field of the IPv4 packet. The IPv4 packet formed by performing the IP header conversion as mentioned above is sent to the IP transmitting and receiving means 10. The IP transmitting and receiving means 10 transmits the IPv4 packet to the IPv4-IPv6 converting apparatus 111 through the IPv4 network.

The IP transmitting and receiving means 10 of the IPv4-IPv6 converting apparatus 111 sends the received IPv4 packet to the IP header converting means 11. The IP header converting means 11 extracts the IPv4 address (133. 144. 95. 1) from the IPv4 source address field of the IPv4 packet, converts the IPv4 address to an 'IPv4-mapped IPv6 address' (: : FFFF : 133. 144. 95. 1) of 128 bits by adding the fixed pattern of 96 bits mentioned above, and sets it into the IPv6 source address field of the IPv6 packet. The IP header converting means 11 extracts the IPv4 address (133. 144. 96. 1) from the IPv4 destination address field of the IPv4 packet and sends the IPv4 address to the IP address conversion information holding means 15. The IP address conversion information holding means 15 obtains the IPv6 address (2 : : 1) corresponding to the IPv4 address (133. 144. 96. 1) with reference to the IP address conversion table 151 and sends the IPv6 address to the IP header converting means 11. The IP header converting means 11 sets the IPv6 address (2 : : 1) into the IPv6 destination address field of the IPv6 packet. The IPv6 packet formed by performing the IP header conversion as mentioned above is sent to the IP transmitting and receiving means 10. The IP transmitting and receiving means 10 transmits the IPv6 packet to the IPv6 terminal 115 through the IPv6 network.

In this manner, the communication from the IPv6 terminal 5 to the IPv6 terminal 115 can be started.

Although the invention has been described above by using the communication between the two IPv6 terminals when there is the IPv4 network on the communication path, a similar construction can be also applied to a communication between the two IPv4 terminals when there is the IPv6 network on the communication path.

Although the invention has been also described above by using the communication between the two IPv6 terminals when there is only one IPv4 network on the communication path, a similar construction can be also applied to a communication between the two IPv6 terminals when there are a plurality of IPv4 networks and IPv6 networks on the communication path, a communication between the two IPv4 terminals, and a communication between the IPv4 terminal and the IPv6 terminal.

According to the IPv4-IPv6 communicating method and IPv4-IPv6 converting apparatus of the invention, only the IPv6 protocol is installed to the IPv6 terminal and even if the IPv4 address is not previously fixedly allocated, the communication between the IPv4 terminal and the IPv6 terminal can be executed. Further, since the partner can be designated not by the actual IP address but by the domain name, the communication can be performed without mutually being aware whether the partner uses the IPv4 or IPv6 as a communication protocol.

As for the registration and deletion of the entry in the conversion table of the IPv4 address and IPv6 address, by limiting by the setting of a manager, the system can also become a fire wall between the IPv4 network and the IPv6 network.

A communication between the two IPv6 terminals partitioned by the IPv4 network can be also executed without preliminarily performing any special setting. Similarly, a communication between the two IPv4 terminals partitioned by the IPv6 network can be executed without preliminarily performing any special setting.

Further, even if any special setting is not preliminarily performed, a communication between the IPv4 terminals partitioned by a plurality of IPv4 networks and IPv6 networks, a communication between the IPv6 terminals, and a communication between the IPv4 terminal and the IPv6 terminal can be executed.

What is claimed is:

1. A method for performing communications between a first terminal using IPv6 as a communication protocol and a second terminal using IPv4 as a communication protocol, comprising the steps of:

receiving from said first terminal a first message requesting an IPv6 address as an IP address of said second terminal;

sending a second message inquiring of an IP address of said second terminal to a manager apparatus which manages IPv6 address information or IPv4 address information;

when receiving a third message containing a first IPv4 address possessed by said second terminal, said third message being sent from said manager apparatus in response to said second message, performing recognition that said first IPv4 address thus received differs in a protocol version from the IPv6 address requested by said first terminal;

converting said first IPv4 address into a first IPv6 address corresponding to said first IPv4 address;

sending a fourth message containing said first IPv6 address thus converted as an IP address of said second terminal to said first terminal, said first IPv6 address having a same protocol version as that of the IP address requested by said first terminal;

receiving from said first terminal an IPv6 packet having an IPv6 header containing said first IPv6 address as a destination address and a second IPv6 address possessed by said first terminal as a source address;

converting said first IPv6 address into said first IPv4 address;

converting said second IPv6 address into an arbitrary IPv4 address;

converting said IPv6 header into an IPv4 header containing said first IPv4 address as a destination address and said second IPv4 address as a source address;

creating from said IPv6 packet an IPv4 packet having the IPv4 header thus converted; and sending said IPv4 packet to said second terminal.

2. The method according to claim 1, further comprising the step of storing said second IPv6 address and said second IPv4 address in correspondence to each other.

3. The method according to claim 1, further comprising the steps of:

storing said first IPv6 address and said first IPv4 address in correspondence to each other; and in said first IPv6 address converting step, converting said first IPv6 address into said first IPv4 address stored correspondingly thereto.

4. The method according to claim 3, wherein said first IPv6 address is an IPv6 address temporarily allocated to said second terminal.

5. The method according to claim 1, further comprising the steps of:

holding at least one IPv4 address; and in said second IPv6 address converting step, further allocating arbitrary one, as said second IPv4 address, of said at least one IPv4 address to said second IPv6 address.

6. The method according to claim 5, further comprising the step of storing said second IPv6 address and said second IPv4 address in correspondence to each other.

7. The method according to claim 1, wherein said second IPv6 address converting step further comprises:

sending a fifth message requesting an IPv4 address to an apparatus which allocates an IPv4 address;

receiving a sixth message containing an arbitrary IPv4 address, as said second IPv4 address, said sixth message being sent from said apparatus in response to said fifth message; and converting said second IPv6 address into said second IPv4 address thus received.

8. The method according to claim 1, further comprising the steps of:

previously storing said second IPv6 address and said second IPv4 address in correspondence to each other; and in said second IPv6 address converting step, converting said second IPv6 address into said second IPv4 address stored.

9. The method according to claim 1, wherein in said second message sending step, said second message is sent to a manager apparatus which manages IPv6 address information and a manager apparatus which manages IPv4 address information, respectively.

10. The method according to claim 1, wherein:

in said second message sending step, said second message is sent to a first manager apparatus which manages IPv6 address information, and if it is decided that the third message is not received from said first manager apparatus, said second message is sent to a second manager apparatus which manages IPv4 information.

11. A method for performing communications between a first terminal using IPv6 as a communication protocol and a second terminal using IPv4 as a communication protocol, comprising the steps of:

receiving from said first terminal a first message requesting an IPv6 address as an IP address corresponding to a domain name of said second terminal;

sending a second message inquiring of an IP address corresponding to the domain name of said second terminal to a DNS apparatus which manages IPv6 domain information or IPv4 domain information;

when receiving a third message containing a first IPv4 address possessed by said second terminal, said third message being sent from said DNS apparatus in response to said second message, converting said first IPv4 address thus received into a first IPv6 address corresponding to said first IPv4 address in order to notify said first terminal of an IP address having a same protocol version as that of the IP address requested from said first terminal;

sending a fourth message containing said first IPv6 address thus converted as an IPv6 address of said second terminal to said first terminal;

receiving from said first terminal an IPv6 packet having an IPv6 header containing said first IPv6 address as a destination address and a second IPv6 address possessed by said first terminal as a source address;

converting said first IPv6 address into said first IPv4 address;

converting said second IPv6 address into an arbitrary second IPv4 address;

converting said IPv6 header into an IPv4 header containing said first IPv4 address as a destination address and said second IPv4 address as a source address;

creating from said IPv6 packet an IPv4 packet having the IPv4 header thus converted; and sending said IPv4 packet to said second terminal.

12. The method according to claim 11, wherein in said second message sending step, said second message is sent to a DNS apparatus which manages IPv4 domain information in a case where an IP address of said second terminal could not be obtained even if said second message had been sent to said DNS apparatus which manages IPv6 domain information.

13. A method for performing communications between a first terminal connected to an IPv6 network and a second terminal connected to an IPv4 network, comprising the steps of:

receiving from said first terminal, a first message requesting an IPv6 address as an IP address corresponding to a domain name of said second terminal;

sending a second message inquiring of an IP address corresponding to the domain name of said second terminal to a DNS apparatus which manages domain information of an IPv6 network or domain information of an IPv4 network;

when receiving a third message containing a first IPv4 address possessed by said second terminal, said third message being sent from said DNS apparatus in response to said second message, converting said first IPv4 address thus received into a first IPv6 address corresponding to said first IPv4 address in order to notify said first terminal of an IP address having a same protocol version as that of the IP address requested from said first terminal;

sending a fourth message containing said first IPv6 address thus converted as an IPv6 address of said second terminal to said first terminal;

receiving from said first terminal an IPv6 packet having an IPv6 header containing said first IPv6 address as a destination address and a second IPv6 address possessed by said first terminal as a source address;

converting said first IPv6 address into said first IPv4 address;

converting said second IPv6 address into an arbitrary second IPv4 address;

converting said IPv6 address into an IPv4 header containing said first IPv4 address as a destination address and said second IPv4 address as a source address;

creating from said IPv6 packet an IPv4 packet having the IPv4 header thus converted; and sending said IPv4 packet to said second terminal.

14. The method according to claim 13, wherein in said second message sending step, said second message is sent to a DNS apparatus which manages domain information of an IPv6 network and a DNS apparatus which manages domain information of an IPv4 network, respectively.

15. A method for performing communications between a first terminal using IPv6 as a communication protocol and a second terminal using IPv4 as a communication protocol, comprising the steps of:

receiving from said first terminal a first message requesting an IPv6 address as an IP address of said second terminal;

sending a second message inquiring of an IP address of said second terminal to a manager apparatus which manages IPv6 address information or IPv4 address information;

when receiving a third message containing a first IPv4 address possessed by said second terminal, said third message being sent from said manager apparatus in response to said second message, performing recognition that said first IPv4 address thus received differs in a protocol version from an IPv6 address requested by said first terminal;

converting said first IPv4 address into a first IPv6 address corresponding to said first IPv4 address;

sending a fourth message containing said first IPv6 address thus converted as an IP address of said second terminal to said first terminal, said first IPv6 address having a same protocol version as that of the IP address requested by said first terminal;

receiving from said first terminal an IPv6 packet having an IPv6 header containing said first IPv6 address as a destination address;

converting said first IPv6 address into said first IPv4 address;

converting said IPv6 header into an IPv4 header containing said first IPv4 address as a destination address;

creating from said IPv6 packet an IPv4 packet having said IPv4 header thus converted; and sending said IPv4 packet to said second terminal.

16. The method according to claim 15, further comprising the steps of:

storing said first IPv6 address and said first IPv4 address in correspondence to each other; and in said first IPv6 address converting step, converting said first IPv6 address into said first IPv4 address stored correspondingly thereto.

17. The method according to claim 16, wherein said first IPv6 address is an IPv6 address temporarily allocated to said second terminal.

18. The method according to claim 15, further comprising the steps of:

holding at least one IPv4 address;

allocating an arbitrarily second IPv4 address of said at least one IPv4 address thus held to a second IPv6 address possessed by said first terminal contained as a source address in said IPv6 header of said IPv6 packet; and in said step of converting said IPv6 header into said IPv4 header, converting said second IPv6 address contained as a source address in said IPv6 header into said second one IPv4 address.

19. The method according to claim 18, further comprising the step of storing said second IPv6 address and said second IPv4 address in correspondence to each other.

20. The method according to claim 15, wherein said step of converting said IPv6 header into said IPv4 header further comprises the substeps of:
    sending a fifth message requesting an IPv4 address to an apparatus which allocates IPv4 addresses;
    receiving a sixth message containing an arbitrary second IPv4 address, said sixth message being sent from said apparatus in response to said fifth message; and
    converting a second IPv6 address possessed by said first terminal contained as a source address in said IPv6 header into said second IPv4 address.

21. The method according to claim 20, wherein said second IPv6 address and said second IPv4 address are stored in correspondence to each other.

22. The method according to claim 15, further comprising the steps of:
    storing a second IPv6 address possessed by said first terminal and arbitrary second IPv4 address in correspondence to each other; and
    in said step of converting said IPv6 header into said IPv4 header, converting said second IPv6 address contained as a source address in said IPv6 header into said second IPv4 address thus stored.

23. The method according to claim 15, wherein in said second message sending step, said second message is sent to a manager apparatus which manages IPv6 address information and a manager apparatus which manages IPv4 address information, respectively.

24. The method according to claim 15, wherein:
    in said second message sending step, said second message is sent to a first manager apparatus which manages IPv6 address information, and
    if it is decided that said third message is not received from said first manager apparatus, said second message is sent to a second manager apparatus which manages IPv4 address information.

25. A method for performing communications between a first terminal using IPv6 as a communication protocol and a second terminal using IPv4 as a communication protocol, comprising the steps of:
    receiving from said first terminal a first message requesting an IPv6 address as an IP address corresponding to a domain name of said second terminal;
    sending a second message inquiring of an IP address corresponding to the domain name of said second terminal to a DNS apparatus which manages IPv6 domain information or IPv4 domain information;
    when receiving a third message containing a first IPv4 address possessed by said second terminal, said third message being sent from said DNS apparatus in response to said second message, converting said first IPv4 address thus received into a first IPv6 address corresponding to said first IPv4 address in order to notify said first terminal of an IP address having a same protocol version as that of the IP address requested from said first terminal;
    sending a fourth message containing said first IPv6 address as an IPv6 address of said second terminal to said first terminal;
    receiving from said first terminal an IPv6 packet having an IPv6 header containing said first IPv6 address as a destination address;
    converting said first IPv6 address into said first IPv4 address;
    converting said IPv6 header into an IPv4 header containing said first IPv4 address as a destination address;
    creating from said IPv6 packet an IPv4 packet having the IPv4 header thus converted; and
    sending said IPv4 packet to said second terminal.

26. The method according to claim 25, wherein in said second message sending step, said second message is sent to a DNS apparatus which manages IPv4 domain information in a case where an IP address of said second terminal could not be obtained even if said second message has been sent to a DNS apparatus which manages IPv6 domain information.

27. A method for performing communications between a first terminal connected to an IPv6 network and a second terminal connected to an IPv4 network, comprising the steps of:
    receiving from said first terminal a first message requesting an IPv6 address as an IP address corresponding to a domain name of said second terminal;
    sending a second message inquiring of an IP address corresponding to the domain name of said second terminal to a DNS apparatus which manages domain information of an IPv6 network or domain information of an IPv4 network;
    when receiving a third message containing a first IPv4 address possessed by said second terminal, said third message being sent from said DNS apparatus in response to said second message, performing recognition that said first IPv4 address thus received differs in a protocol version from an IPv6 address requested by said first terminal;
    converting said first IPv4 address into a first IPv6 address corresponding to said first IPv4 address;
    sending a fourth message containing said first IPv6 address as an IP address of said second terminal to said first terminal, said first IPv6 address having a same protocol version as that of the IP address requested by said first terminal;
    receiving from said first terminal said first IPv6 packet having an IPv6 header containing said first IPv6 address as a destination address;
    converting said first IPv6 address into said first IPv4 address;
    converting said IPv6 header into an IPv4 header containing said first IPv4 address as a destination address;
    creating from said IPv6 packet an IPv4 packet having the IPv4 header thus converted; and
    sending said IPv4 packet to said second terminal.

28. The method according to claim 27, wherein in said second message sending step, said second message is sent to a DNS apparatus which manages IPv4 domain information in a case where an IP address of said second terminal could not be obtained even if said second message had been sent to said a apparatus which manages IPv6 domain information.

* * * * *